US012672016B2

(12) United States Patent
Shao et al.

(10) Patent No.: US 12,672,016 B2
(45) Date of Patent: Jun. 30, 2026

(54) SYSTEMS AND METHODS FOR CSI-RS CONFIGURATION AND INDICATION

(71) Applicant: ZTE CORPORATION, Shenzhen (CN)

(72) Inventors: Shijia Shao, Shenzhen (CN); Bo Gao, Shenzhen (CN); Shujuan Zhang, Shenzhen (CN); Ke Yao, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 286 days.

(21) Appl. No.: 18/489,544

(22) Filed: Oct. 18, 2023

(65) Prior Publication Data

US 2024/0049018 A1 Feb. 8, 2024

Related U.S. Application Data

(63) Continuation of application No. PCT/CN2022/073657, filed on Jan. 25, 2022.

(51) Int. Cl.
*H04W 24/08* (2009.01)
*H04L 5/00* (2006.01)

(52) U.S. Cl.
CPC ........... *H04W 24/08* (2013.01); *H04L 5/0057* (2013.01)

(58) Field of Classification Search
CPC .... H04W 24/08; H04L 5/0057; H04L 5/0023; H04L 5/0048; H04L 5/0016
USPC ........................................................ 370/252
See application file for complete search history.

(56) References Cited

U.S. PATENT DOCUMENTS

| | | | | |
|---|---|---|---|---|
| 2020/0212983 A1* | 7/2020 | Cha | ........................... | H04B 7/06 |
| 2020/0336355 A1 | 10/2020 | Yamada et al. | | |
| 2021/0288707 A1* | 9/2021 | Hang | ..................... | H04B 7/026 |
| 2021/0314045 A1 | 10/2021 | Cha et al. | | |
| 2022/0217742 A1* | 7/2022 | Kim | ...................... | H04L 5/0044 |
| 2022/0256561 A1* | 8/2022 | Kim | ........................ | H04L 5/005 |
| 2022/0338042 A1* | 10/2022 | Cirik | .................... | H04L 1/1812 |
| 2022/0361195 A1* | 11/2022 | Sun | ........................ | H04L 5/0051 |
| 2023/0059966 A1* | 2/2023 | Kyung | ................. | H04L 5/0051 |
| 2023/0353311 A1* | 11/2023 | Khoshnevisan | ...... | H04L 5/0051 |
| 2024/0031845 A1* | 1/2024 | Fan | ........................ | H04L 5/0048 |
| 2025/0125926 A1* | 4/2025 | Muruganathan | .... | H04W 72/231 |

FOREIGN PATENT DOCUMENTS

| | | |
|---|---|---|
| CN | 107567695 A | 1/2018 |
| CN | 110959268 A | 4/2020 |
| CN | 113632393 A | 11/2021 |

(Continued)

OTHER PUBLICATIONS

Samsung, "Remaining details on CSI-RS", 3GPP TSG RAN WG1 Meeting 91, R1-1720310, Dec. 1, 2017, Reno, USA (9 pages).

(Continued)

*Primary Examiner* — Rownak Islam
(74) *Attorney, Agent, or Firm* — Foley & Lardner LLP

(57) ABSTRACT

Presented are systems and methods for CSI-RS configuration and indication. A wireless communication device can receive a configuration of a channel state information reference signal (CSI-RS) resource for measurement of a plurality of channels form a wireless communication node. The wireless communication device can determine measurement results according to the configuration of the CSI-RS resource.

19 Claims, 14 Drawing Sheets

(56)         References Cited

FOREIGN PATENT DOCUMENTS

EP          2 747 507  A1      6/2014
WO     WO-2022/006729  A1      1/2022

OTHER PUBLICATIONS

Extended European Search Report for EP App. No. 22922598.2
dated Apr. 29, 2024 (7 pages).
International Search Report and Written Opinion for PCT/CN2022/
073657 dated Aug. 10, 2022 (6 pages).

\* cited by examiner

SYSTEMS AND METHODS FOR CSI-RS CONFIGURATION AND INDICATION

CROSS-REFERENCE TO RELATED APPLICATION

This application claims the benefit of priority under 35 U.S.C. § 120 as a continuation of PCT Patent Application No. PCT/CN2022/073657, filed on Jan. 25, 2022, the disclosure of which is incorporated herein by reference in its entirety.

TECHNICAL FIELD

The disclosure relates generally to wireless communications, including but not limited to systems and methods for CSI-RS configuration and indication.

BACKGROUND

In the 5th Generation (5G) New Radio (NR) mobile networks, a user equipment (UE) can send data to a base station (BS) by obtaining uplink synchronization and downlink synchronization with the BS. The BS can use a certain type of signaling to configure the UE for uplink and/or downlink transmission, such as downlink control information (DCI).

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, method, apparatus, or a computer-readable medium, as applied to any portion of the present disclosure. A wireless communication device may receive a configuration of a channel state information reference signal (CSI-RS) resource for measurement of a plurality of channels from a wireless communication node. The wireless communication device can determine measurement results according to the configuration of the CSI-RS resource.

In some implementations, the configuration of the CSI-RS resource can include a plurality of sets of code division multiplexing (CDM) groups corresponding to the plurality of channels. Each of the plurality of sets of CDM groups can include at least one CDM group. In some cases, the wireless communication device can receive a radio resource control (RRC) signaling that identifies one or more CDM groups within each set of the plurality of sets of CDM groups from the wireless communication node.

In some implementations, the wireless communication device can receive a radio resource control (RRC) signaling that includes a list of the sets of CDM groups configured for the CSI-RS resource from the wireless communication node. In some implementations, one or more CDM groups within a first set of the plurality of sets of CDM groups can be first numbered in order of increasing frequency domain allocation, and then numbered in order of increasing time domain allocation. In some cases, ports of the CSI-RS in a CDM group numbered with a lowest group number, can be numbered with lowest contiguous port numbers (e.g., port numbers of the lowest values that are contiguous with respect to each other, such as ports 0 & 1). Ports of the CSI-RS in a CDM group numbered with a group number immediately higher than the lowest group number, may be numbered with contiguous port numbers that are immediately higher than the lowest contiguous port numbers (e.g., ports 2 & 3).

In some implementations, the CSI-RS resource can be a periodic or semi-persistent CSI-RS resource, and is configured with a plurality of quasi co-location (QCL) information or a plurality of transmission configuration indicator (TCI) states. In some implementations, radio resource control (RRC) parameter qcl-InfoPeriodicCSI-RS can be configured to include a plurality of transmission configuration indicator (TCI) states. In some cases, each of the plurality of sets of CDM groups may be associated with each of the plurality of QCL information or each of the plurality of TCI states.

In some implementations, a TCI state that is first indicated from the plurality of TCI states, or a QCL information that is first indicated from the plurality of QCL information, can be associated with a set of CDM groups that has a first or lowest index. In some cases, the CSI-RS resource can be an aperiodic CSI-RS resource, and can be configured with a plurality of lists of quasi co-location (QCL) information or a plurality of lists of transmission configuration indicator (TCI) states.

In some implementations, radio resource control (RRC) parameter qcl-Info can be configured to include a plurality of lists of transmission configuration indicator (TCI) states, or a plurality of RRC parameters may each be configured to include a respective one of the plurality of lists of TCI states. In some cases, each of the plurality of sets of CDM groups may be associated with each of the plurality of lists of QCL information or each of the plurality of lists of TCI states. In some implementations, a list of TCI states that is first indicated from the plurality of lists of TCI states, or a list of QCL information that is first indicated from the plurality of lists of QCL information, may be associated with a set of CDM groups that has a first or lowest index. Subsequent indicated lists of TCI states or QCL information may be correspondingly associated with next or higher indexes.

In some implementations, the wireless communication device can receive N transmission occasions of the CSI-RS from the wireless communication node according to the configuration of the CSI-RS resource. The N transmission occasions can correspond to the plurality of channels, and each of the N transmission occasions being in a respective slot or at least one respective symbol, where N is an integer value that is greater than 1. In some cases, each of the N transmission occasions may be transmitted in a same set of at least one symbol in a different slot.

In some implementations, each of the N transmission occasions may be transmitted in a different set of at least one symbol. In some cases, time domain and frequency domain resource allocation of a first transmission occasion of the N transmission occasions, can be indicated by one or more RRC parameters. In some implementations, each subsequent one of the N transmission occasions can be in a next closest available slot from a slot of an immediately preceding one of the N transmission occasions, and can have a same frequency domain resource allocation and positions (e.g., symbol index values or time domain locations) of time domain symbols as those of a first transmission occasion of the N transmission occasions.

In some implementations, each subsequent one of the N transmission occasions can be in a next closest available symbol from a symbol of an immediately preceding one of the N transmission occasions, and can have a same CSI-RS pattern as that of a first transmission occasion of the N transmission occasions. In some implementations, in a CSI-RS pattern, mapping of the CSI-RS to physical resources over the N transmission occasions is such that a time domain symbol shape (e.g., physical resources' relative positions with respect with each other) of each of the N transmission occasions can be same, while a position (e.g., actual position(s) in time domain) of time domain symbols of each of the N transmission occasions is same or different.

In some implementations, the next closest available slot or symbol can be a next closest slot or symbol that meets a transmission requirement (or a plurality of transmission requirements) for the CSI-RS. In some implementations, the N transmission occasions can occupy slots or symbols determined according to an indication from the wireless communication node. In some implementations, the indication can include an offset between adjacent slots or symbols. In some implementations, if the offset is not configured (e.g., value of the offset is not set/defined/specified/included in the indication), an offset of 0 can be applied/assumed (e.g., by default).

In some implementations, if a specific one of the determined slots or symbols fails to meet a transmission requirement for the CSI-RS, a next one (e.g., in order of increasing slot number/index) of the determined slots or symbols that meets the transmission requirement may be occupied in lieu of the specific one. In some implementations, the CSI-RS may include 12 CDM groups corresponding to a CSI-RS pattern of:

$(k_0, l_0)$, $(k_1, l_0)$, $(k_2, l_0)$, $(k_3, l_0)$, $(k_4, l_0)$, $(k_5, l_0)$, $(k_0, l_0+1)$, $(k_1, l_0+1)$, $(k_2, l_0+1)$, $(k_3, l_0+1)$, $(k_4, l_0+1)$, $(k_5, l_0+1)$;

$(k_0, l_0)$, $(k_1, l_0)$, $(k_2, l_0)$, $(k_3, l_0)$, $(k_4, l_0)$, $(k_5, l_0)$, $(k_0, l_1)$, $(k_1, l_1)$, $(k_2, l_1)$, $(k_3, l_1)$, $(k_4, l_1)$, $(k_5, l_1)$;

$(k_0, l_0)$, $(k_1, l_0)$, $(k_2, l_0)$, $(k_3, l_0)$, $(k_0, l_0+1)$, $(k_1, l_0+1)$, $(k_2, l_0+1)$, $(k_3, l_0+1)$, $(k_0, l_0+2)$, $(k_1, l_0+2)$, $(k_2, l_0+2)$, $(k_3, l_0+2)$; $(k_0, l_0)$, $(k_1, l_0)$, $(k_2, l_0)$, $(k_3, l_0)$ $(k_0, l_1)$, $(k_1, l_1)$, $(k_2, l_1)$, $(k_3, l_1)$, $(k_0, l_2)$, $(k_1, l_2)$, $(k_2, l_2)$, $(k_3, l_2)$, where $k_0$, $k_1$, $k_2$, $k_3$, $k_4$, $k_5$, $l_0$ and $l_1$ each is an integer value.

In some implementations, the CSI-RS pattern can be associated with at least one of: 24 ports, or a CDM type of td-CDM2. In some cases, the CSI-RS pattern may have a density of 1 or 0.5. In some implementations, the CSI-RS pattern may be defined according to at least one of: a frequency domain offset ($k'$) of 0 or 1, or a time domain offset ($l'$) of 0.

At least one aspect is directed to a system, method, apparatus, or a computer-readable medium, as applied to any portion of the present disclosure. A wireless communication node can send a configuration of a channel state information reference signal (CSI-RS) resource for measurement of a plurality of channels. The wireless communication node can initiate transmission of a CSI-RS to a wireless communication device according to the configuration.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

DETAILED DESCRIPTION

1. Mobile Communication Technology and Environment

Figure 1:
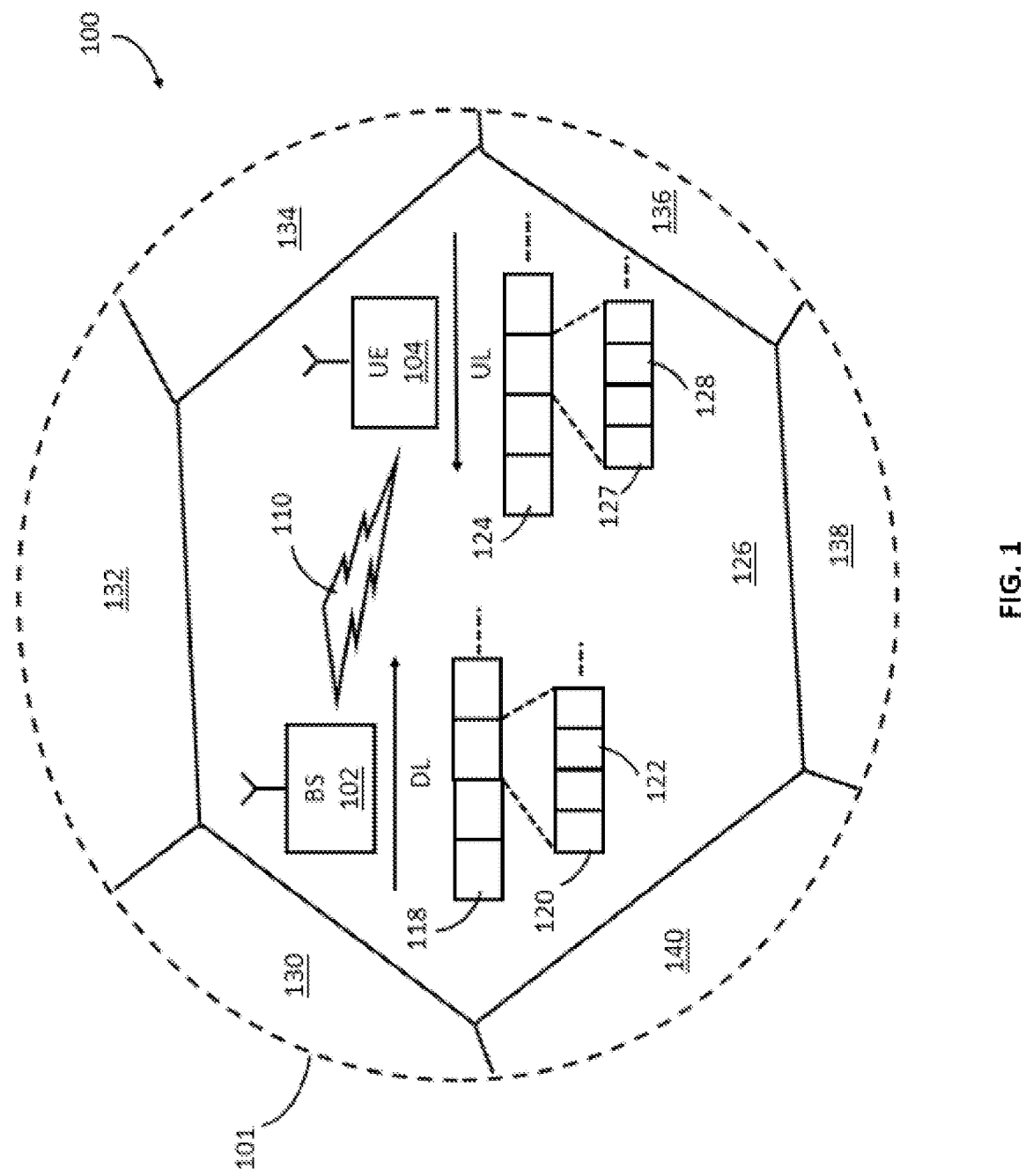
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
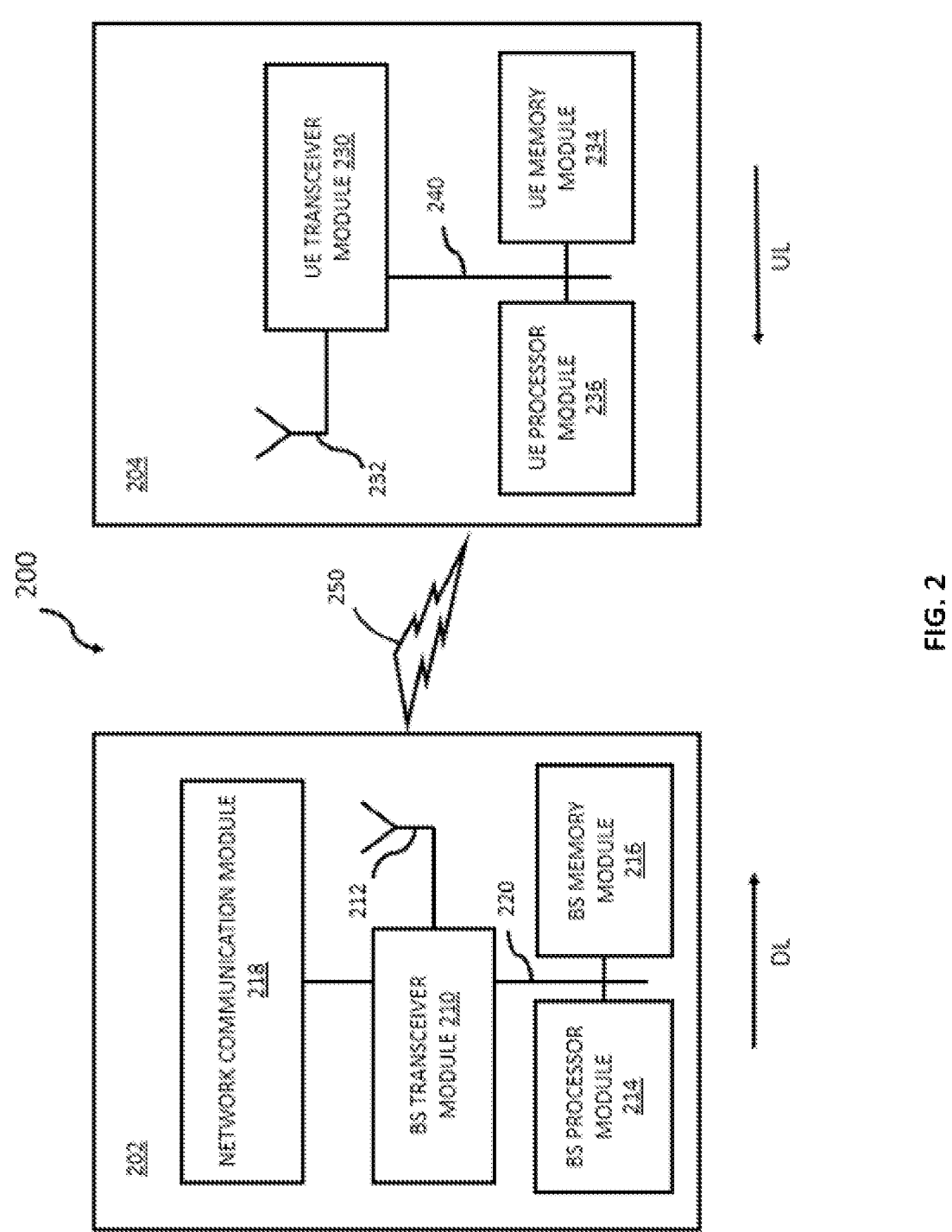
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

2. Systems and Methods for CSI-RS Configuration and Indication

In certain systems (e.g., 5G new radio (NR), Next Generation (NG) systems, 3GPP systems, and/or other systems), a multiple transmission and reception point (MTRP) technology can be deployed/implemented/established/used to improve the coverage at the cell edge and reduce the negative impact of the blocking effect. MTRP can be used for non-coherent joint transmission (NCJT). Further, MTRP can be used for coherent joint transmission (CJT). Many networks may be used for CJT with integrated radio access network (C-RAN) architecture (e.g., for outdoor macro and/or indoor cells) and/or intra-site coordination.

Compared to NCJT, in a CJT scenario, more antennas can be used for joint transmission with higher antenna gains. For example, CJT can include a number of additional antennas (e.g., greater than in NCJT) for joint scheduling for data transmission. Having more antennas for joint scheduling can improve cell-average and cell-edge performance, can increase the flexibility of handling interference, and perform higher-order of multi-user (MU)-pairing. To obtain/acquire/receive related channel information, the BS 102 (e.g., gNB or wireless communication node) can send/transmit/provide/signal/communicate channel state information reference signal (CSI-RS) resources to perform the channel detection. However, the CSI-RS resource configuration of certain systems may not be optimized, updated, or adequate for the CJT scenario/approach/implementation.

Hence, the systems and methods of the technical solution, discussed herein, can provide a configuration of CSI-RS resources for the CJT scenario. For example, the systems and methods can introduce/provide/implement a new/improved/modified resource pattern (e.g., mapping of frequency domain and/or time domain) to meet/satisfy the requirement that MTRP use the same CSI-RS resource. In another example, the systems and methods can enhance/improve an indication of CDM group(s) for MTRP including for instance the numbering of CSI-RS resources ports and an indication of QCL information. In a further example, the systems and methods can implement/enhance separate configurations for one CSI-RS resource.

In certain systems, an MTRP approach/feature/technique/technology may utilize/include/leverage multiple TRPs to improve the communication (e.g., transmission and/or reception) throughput in the Long Term Evolution (LTE), Long Term Evolution-Advanced (LTE-A), and/or New Radio (NR) access technology in the Enhanced Mobile Broadband (eMBB) scenario. Further, utilizing the Multi-TRP transmission and/or reception can reduce the probability of information blockage (e.g., reduce packet drop, which would otherwise lead to wasted resources and/or increased traffic, etc.) and improve the transmission reliability in Ultra-reliability and Low Latency Communication (URLLC) scenarios.

In certain systems, the coordinated multiple points transmission/reception may be divided/split/included/separated/allocated into two types, such as based on or according to a mapping relationship between the transmitted signal flow and/or multi-TRP/panel. For instance, the two types may include at least a coherent joint transmission (sometimes referred to as coherent transmission) and non-coherent joint transmission (sometimes referred to as non-coherent transmission), among others. For coherent joint transmission, each data layer can be mapped to multiple-TRPs/panels through weighted vectors. In some instances, during deployment (e.g., real-world/actual deployment environment), the coherent joint transmission mode may include higher requirements for synchronization between TRPs and the transmission capability of backhaul links.

For non-coherent joint transmission (NCJT) (e.g., NCJT mode), the NCJT mode may be less affected by the one or more factors. Therefore, certain systems may leverage or consider the NCJT mode in coordinated multiple points transmission/reception. For NCJT, the system may map each data flow only to the port corresponding to the TRP/panel with the same channel large-scale parameters (e.g., Quasi Co Location (QCL)). In some cases, the system may map different data flows to different ports with different large-scale parameters. In this case, one or more TRPs may not need to be processed as a virtual array.

In the NCJT scenario/approach, the BS 102 can obtain/ receive/acquire one or more measurements of the channel quality for corresponding TRPs by sending/initiating/providing different CSI-RS resources. In this case, the UE 104 (e.g., wireless communication device) may receive/obtain the different CSI-RS resources. In response to receiving the CSI-RS resources, the UE 104 can calculate and report to the BS 102 according to or based on the respective CSI-RS resources. In the case of CJT, the UE 104 may need or be required to perform joint calculations and report upon, in response to, or subsequent to receiving the CSI-RS resources. Hence, the systems and methods discussed herein can configure CSI-RS resource(s) such that the UE 104 can perform the joint calculations and reporting of channel quality measurements for the TRPs.

In some implementations, the definition/term/element/ feature/indication/mention of "beam" may include, correspond to, or be a part of quasi-co-location (QCL) state, transmission configuration indicator (TCI) state, spatial relation state (e.g., sometimes referred to as spatial relation information state), reference signal (RS), spatial filter, and/ or pre-coding. In some cases, the term "Tx beam" may include or correspond to QCL state, TCI state, spatial relation state, DL/UL reference signal (e.g., channel state information reference signal (CSI-RS), synchronization signal block (SSB) (e.g., sometimes referred to as SS/PBCH), demodulation reference signal (DMRS), sounding reference signal (SRS), and/or physical random access channel (PRACH)), Tx spatial filter, and/or Tx precoding.

In some cases, the term "Rx beam" may include or correspond to QCL state, TCI state, spatial relation state, spatial filter, Rx spatial filter, and/or Rx precoding. The term "beam ID" may include or correspond to equivalent to QCL state index, TCI state index, spatial relation state index, reference signal index, spatial filter index, and/or precoding index. In some cases, the spatial filter may be either UE-side or BS-side (e.g., gNB-side) one. The spatial filter may sometimes be referred to as spatial-domain filter.

In some implementations, the term "spatial relation information" can include at least one or more reference RSs. The one or more reference RSs may be used to represent "spatial relation" between targeted "RS or channel" and the one or more reference RSs. In some cases, the term "spatial relation" may refer to the same/quasi-co beam(s), same/quasi-co spatial parameter(s), and/or same/quasi-co spatial domain filter(s). In certain cases, the term "spatial relation" may refer to the beam, spatial parameter, and/or spatial domain filter.

In some cases, the term "QCL state" may include or be a part of one or more reference RSs and/or the corresponding QCL type parameters of the one or more reference RSs. The QCL type parameters may include at least one or a combination of: Doppler spread, Doppler shift, delay spread, average delay, average gain, and/or spatial parameter. The spatial parameter may refer to the spatial Rx parameter. In some cases, the term "TCI state" may include or correspond to "QCL state".

The QCL types can include at least 'QCL-TypeA,' 'QCL-TypeB,' 'QCL-TypeC,' and/or 'QCL-TypeD.' The 'QCL-TypeA' can include or correspond to doppler shift, doppler spread, average delay, and/or delay spread. The 'QCL-TypeB' can include or correspond to doppler shift, and/or doppler spread. The 'QCL-TypeC' can include or correspond to doppler shift, and/or average delay. The 'QCL-TypeD' can include or correspond to a spatial Rx parameter.

In some cases, the term "UL signal" can include, correspond to, or represent PRACH, PUCCH, PUSCH, UL DMRS, or SRS. The term "DL signal" can correspond to PDCCH, PDSCH, SSB, DL DMRS, or CSI-RS. The group-based reporting may include at least one of "beam group" based reporting and/or "antenna group" based reporting, among others. The term "beam group" may be described as, for instance, different Tx beams within one group can be simultaneously received or transmitted, and/or Tx beams between different groups may not be simultaneously received or transmitted. The term "beam group" may be described from the UE 104 perspective.

In some implementations, the term "BM RS" may refer to or represent beam management reference signal(s), such as CSI-RS, SSB, or SRS. The the term "BM RS group" may correspond to "grouping one or more BM reference signals," and BM RSs from a group may be associated with the same TRP. The term "TRP index" can correspond to "TRP ID," which may be used to distinguish/differentiate/separate different TRPs. The term "panel ID" can correspond to UE panel index.

I. Implementation 1: CSI-RS Pattern

For CJT scenario/approach, a single CSI-RS resource can be used/shared by multiple TRPs. However, the patterns of certain systems may be difficult to implement or use for satisfying/meeting one or more requirements for sharing the CSI-RS resource with multiple TRPs. Hence, the systems and methods can provide/introduce certain patterns for satisfying the requirements. Referring to FIGS. 3-6, examples of 24-port CSI-RS resource patterns can be depicted/illustrated/shown. The pattern (e.g., CSI-RS pattern) can be used to indicate the shape, format, configuration, locations or form that CSI-RS occupies resources in the time and frequency domains. The one or more patterns can be preconfigured/predetermined/specified/indicated/described in the specification or standards, which can include information similar to Table 1, for example.

TABLE 1

| Row | Ports X | Density $\rho$ | cdm-Type | $(\bar{k}, \bar{l})$ | CDM group index j | k' l' |
|---|---|---|---|---|---|---|
| 1 | 24 | 1, 0.5 | fd-CDM2 | $(k_0, l_0), (k_1, l_0), (k_2, l_0),$ $(k_3, l_0), (k_4, l_0), (k_5, l_0),$ $(k_0, l_0 + 1), (k_1, l_0 + 1),$ $(k_2, l_0 + 1), (k_3, l_0 + 1),$ $(k_4, l_0 + 1), (k_5, l_0 + 1)$ $(k_0, l_0), (k_1, l_0), (k_2, l_0),$ | 0, 1, 2, 3, 4, 5, 6, 7, 8, 9, 10, or 11 | 0, 0 1 |

TABLE 1-continued

| Row | Ports X | Density ρ | cdm-Type | $(\bar{K}, \bar{I})$ | CDM group index j | k' l' |
|---|---|---|---|---|---|---|
| 2 | 24 | 1, 0.5 | fd-CDM2 | $(k_3, l_0), (k_4, l_0), (k_5, l_0),$ $(k_0, l_1), (k_1, l_1), (k_2, l_1),$ $(k_3, l_1), (k_4, l_1), (k_5, l_1)$ $(k_0, l_0), (k_1, l_0), (k_2, l_0),$ $(k_3, l_0), (k_0, l_0 + 1),$ $(k_1, l_0 +1), (k_2, l_0 + 1),$ $(k_3, l_0 + 1), (k_0, l_0 + 2),$ $(k_1, l_0 + 2), (k_2, l_0 + 2),$ $(k_3, 0 + 2)$ or $(k_0, l_0), (k_1, l_0), (k_2, l_0),$ $(k_3, l_0)$ $(k_0, l_1), (k_1, l_1), (k_2, l_1),$ $(k_3, l_1), (k_0, l_2), (k_1, l_2),$ $(k_2, l_2), (k_3, l_2)$ | 0, 1, 2, 3, 4, 5, 6, 7, 8, 9, 10, 11 | 0, 0 1 |

In Table 1, $k_M$ and $l_N$ (e.g., where M and N represent integers) can each correspond to a respective integer value as described herein. The $(k_M, l_N)$ can represent a coordinate at which a particular CDM group starts to occupy. In this case, the $k_M$ can indicate/represent the position or shift of a starting frequency band within the frequency domain (e.g., y-axis in a resource/CSI-RS pattern) for a respective CDM group. The $l_N$ can indicate the position of a starting symbol (e.g., time window, timeframe, etc.) within the time domain (e.g., x-axis in a resource/CSI-RS pattern) for the respective CDM group. Based on the values of $k_M$ and $l_N$, one or more patterns can be formed/created/generated for the CDM groups. Each CDM group may correspond to or be associated with a respective TRP. As shown in Table 1, in this case, the pattern may be associated with 24 ports, and a CDM type of frequency domain (fd)-CDM2. Further, the pattern can include a certain density indicated/applied in the configuration of the CSI-RS resource, such as a density of 1, 0.5, among others. In some cases, the pattern may be defined/represented/configured according to or based on one or more offsets. The offsets can be in the frequency domain (e.g., represented by k') or the time domain (e.g., represented by l').

Figure 3:
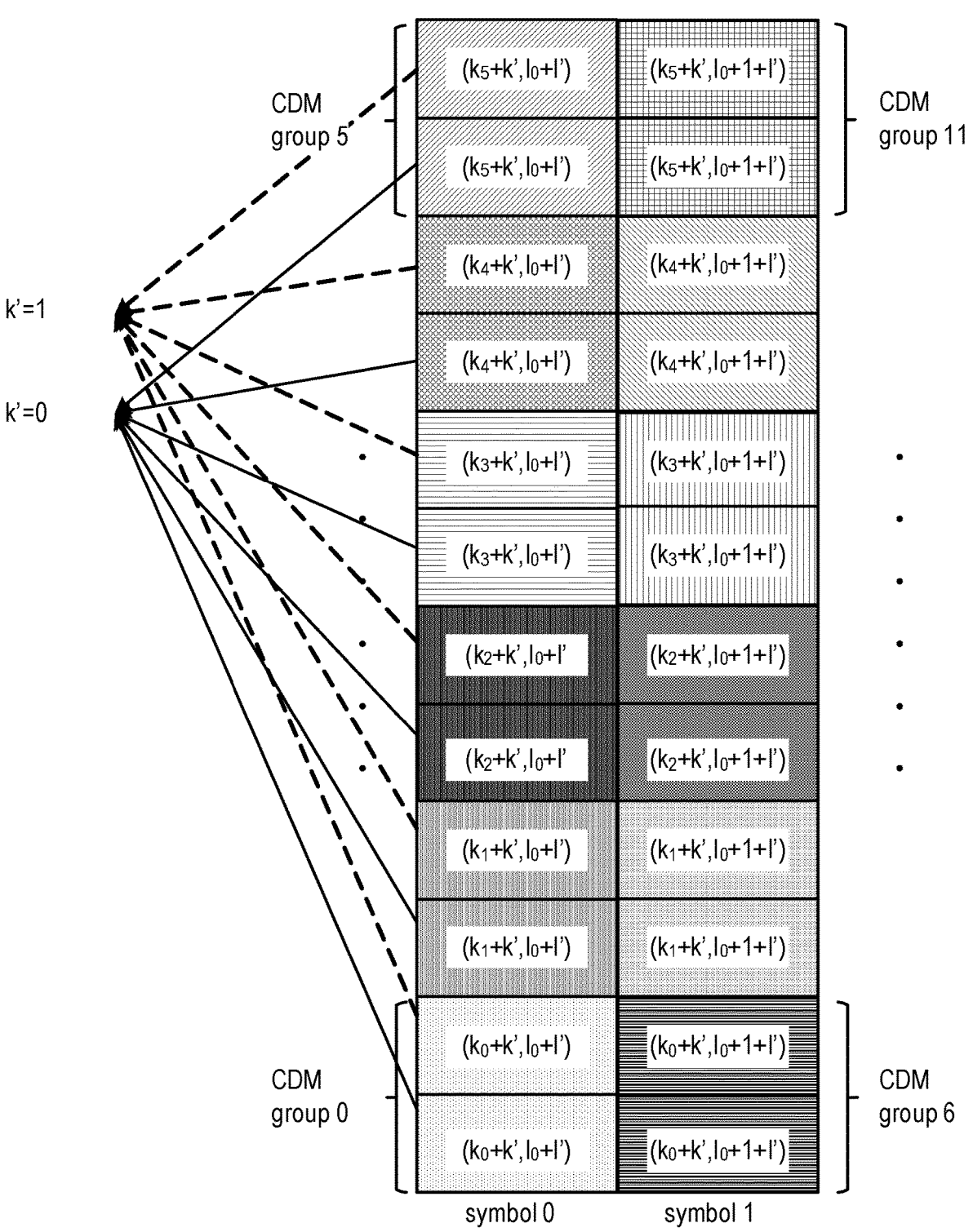
FIGS. 3-6 illustrate examples of 24-port CSI-RS resource patterns, in accordance with some embodiments of the present disclosure.

Referring to FIG. 3, the CSI-RS pattern can be shown according to row 1 of Table 1. The frequency domain and time domain of individual CDM groups (e.g., represented/identified by the CDM group index) can follow the pattern (e.g., positions/locations, in the following sequence/order): $(k_0, l_0), (k_1, l_0), (k_2, l_0), (k_3, l_0), (k_4, l_0), (k_5, l_0), (k_0, l_0+1),$ $(k_1, l_0+1), (k_2, l_0+1), (k_3, l_0+1), (k_4, l_0+1), (k_5, l_0+1)$. For instance, the pattern of the 24-port CSI-RS resource of FIG. 3 can be generated/produced when $k_0=0, k_1=2, k_2=4, k_3=6,$ $k_4=8, k_5=10,$ and $l_0=0$ are configured, by way of illustration. Each of the blocks can represent a resource element (e.g., the respective region/portion in time and frequency domains) or a subcarrier of a physical resource block (PRB), where each CDM group occupies one symbol in the time domain and one or more adjacent frequency bands (e.g., two frequency bands and/or two ports in this case). In this case, each CDM group can be associated with k' values of 0 and 1, thereby occupying two frequency bands (or REs). For example, CDM group 0 can occupy frequency bands 0 and 1, starting/beginning/configured at $k_0=0, l_0=0$ with offsets of k'=0 and k'=1 (e.g., (0+0, 0) and (0+1, 0)). Subsequently, CDM group 1 can occupy frequency bands 2 and 3, starting at $k_0=2, l_0=0$ (e.g., (2+0, 0) and (2+1, 0)), and so forth. In response to occupying the CSI-RS resources in symbol 0 for CDM groups 0-5, an offset/shift can be applied to $l_0$ for transitioning to another symbol. In this case, CDM groups 6-11 can occupy symbol 1, since $l_0$ is increased by 1 based on the configured pattern. Hence, based on the first option of the k and l values in row 1 of Table 1, the pattern or shape that the CSI-RS resources occupy can be shown/illustrated for example according to FIG. 3.

Figure 4:
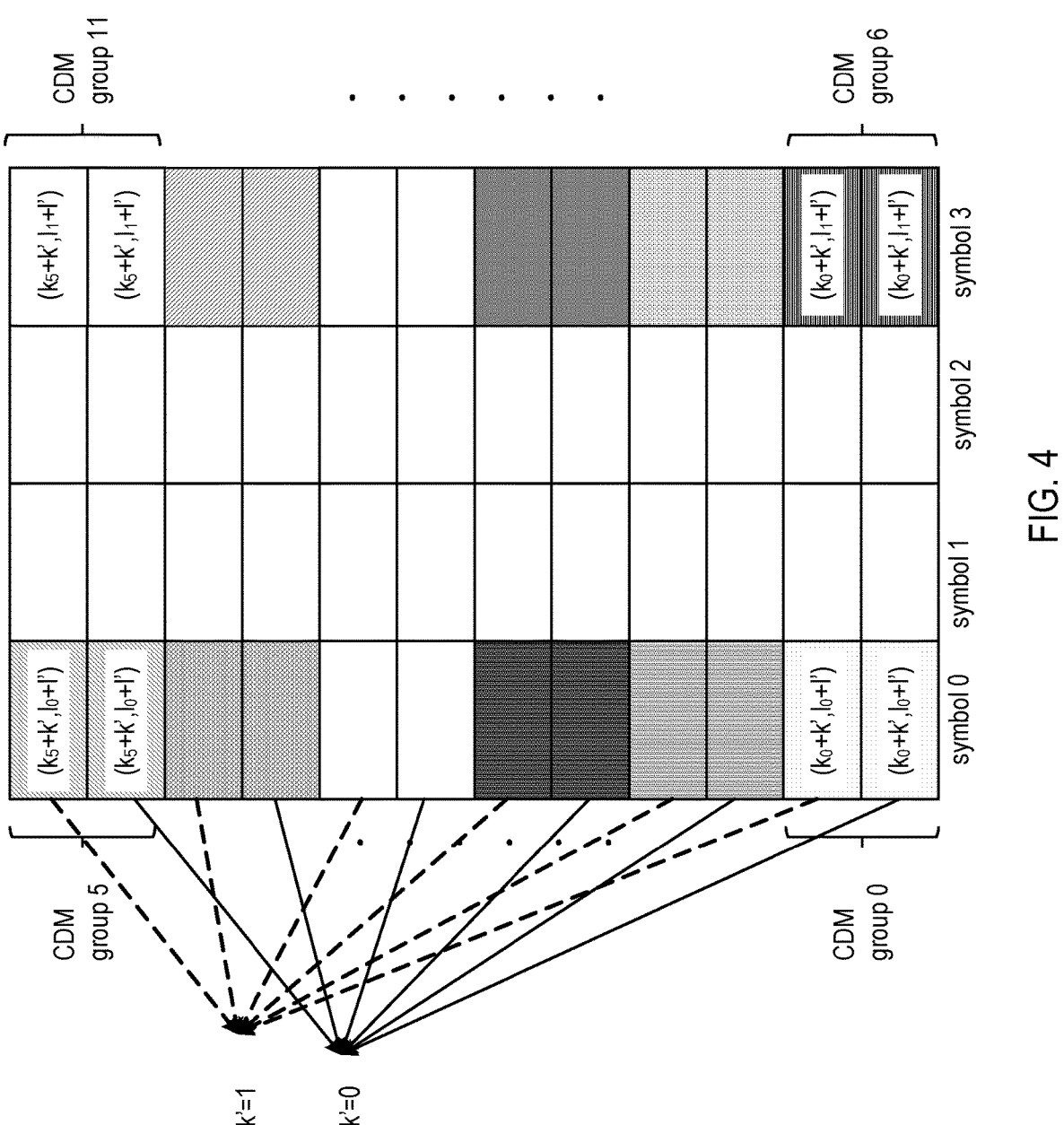

Referring to FIG. 4, an example of the pattern can be based on row 1 of Table 1 and a second option for the k and l values. The second option can include the pattern of $(k_0, l_0), (k_1, l_0), (k_2, l_0), (k_3, l_0), (k_0, l_1, (k_2, (k_3, l_1), (k_0, l_2), (k_1, l_2), (k_2, l_2), (k_3, l_2)$. In this case, the k and l values can include or be configured as $k_0=0, k_1=2, k_2=4, k_3=6, k_4=8,$ $k_5=10, l_0=0,$ and $l_1=3$ for instance by way of illustration. Based on at least the k and l values and an offset (e.g., k' and/or l') of 0 and 1 for the respective CDM group, another example of a 24-port CSI-RS resource pattern can be shown. Since $l_0=0$ and $l_1=3$, the first 6 CDM groups can occupy symbol 0 and the second or remaining 6 CDM groups can occupy symbol 3. The pattern can include a gap (e.g., no occupying CDM group) for symbol 1 and symbol 2, in this example. Accordingly, the patterns of FIGS. 3-4, including 12 CDM groups, can occupy two orthogonal frequency division multiplexing (OFDM) symbols (e.g., either contiguous or non-contiguous) in the time domain and a complete PRB (e.g., 12 consecutive subcarriers) in the frequency domain for symbol.

Figure 5:
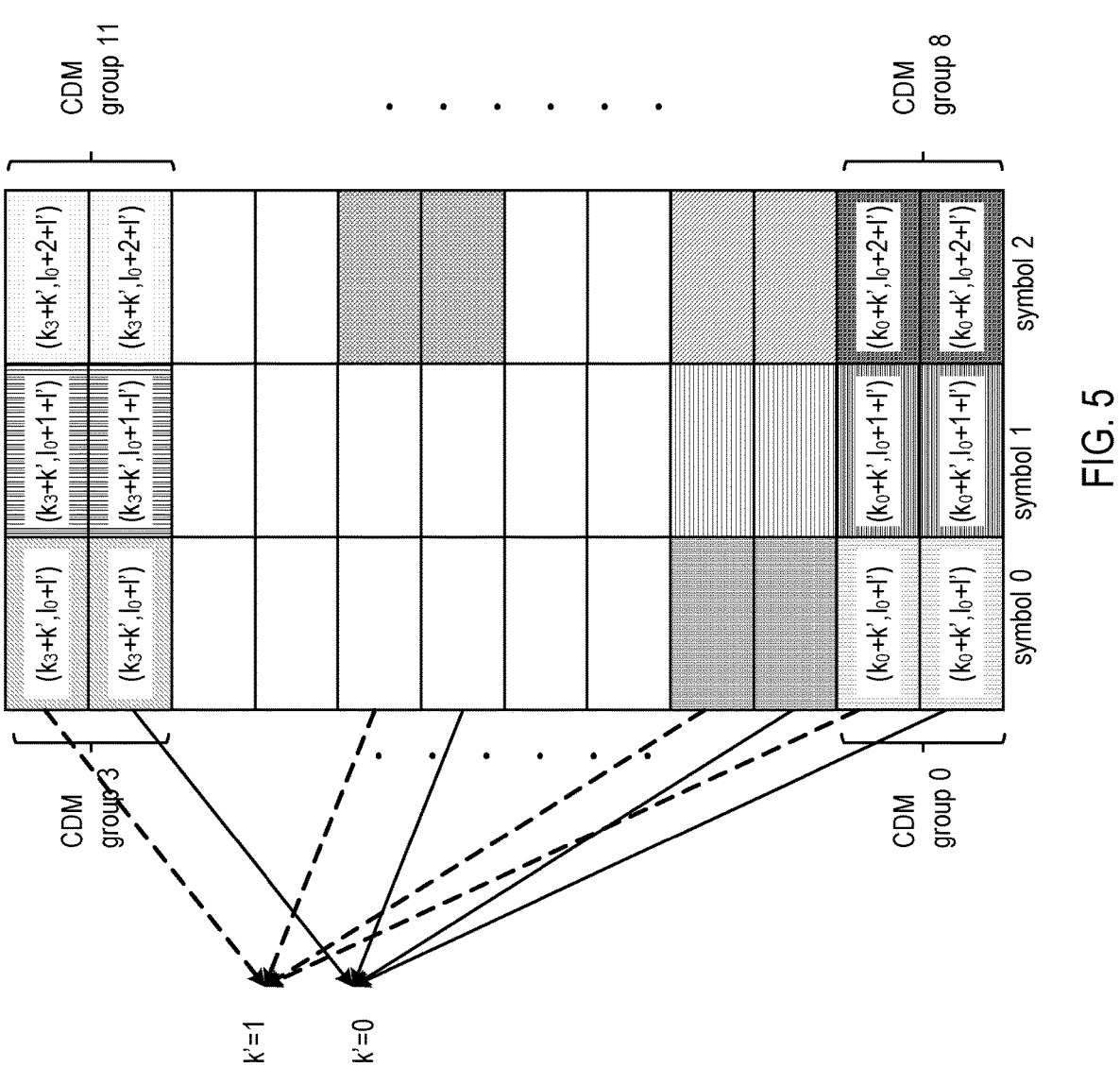

Referring to FIG. 5, depicted is a pattern of the 24-port CSI-RS resource according to or based on information in row 2 of Table 1. The pattern can follow the first option of row 2, including $(k_0, l_0), (k_1, l_0), (k_2, l_0), (k_3, l_0), (k_0, l_0+1),$ $(k_1, l_0+1), (k_2, l_0+1), (k_3, l_0+1), (k_0, l_0+2), (k_1, l_0+2), (k_2,$ $l_0+2), (k_3, l_0+2)$. In this case, the values of k and l can include or be configured as $k_0=0, k_1=2, k_2=6, k_3=10,$ and $l_0=0$ for instance by way of illustration. For each CDM group, the offset can be configured as k'=0, k'=1, and l'=0. Based on the configuration, the pattern can include a gap at k=4, k=5, k=8, and k=9, with four CDM groups occupying each of the symbols 0-2. From bottom to top, the CDM groups 0-3 can occupy symbol 0 (e.g., $l_0=0$), CDM groups 4-7 can occupy symbol 1 (e.g., $l_0+1=1$), and CDM groups 8-11 can occupy symbol 2 (e.g., $l_0+2=2$).

Figure 6:
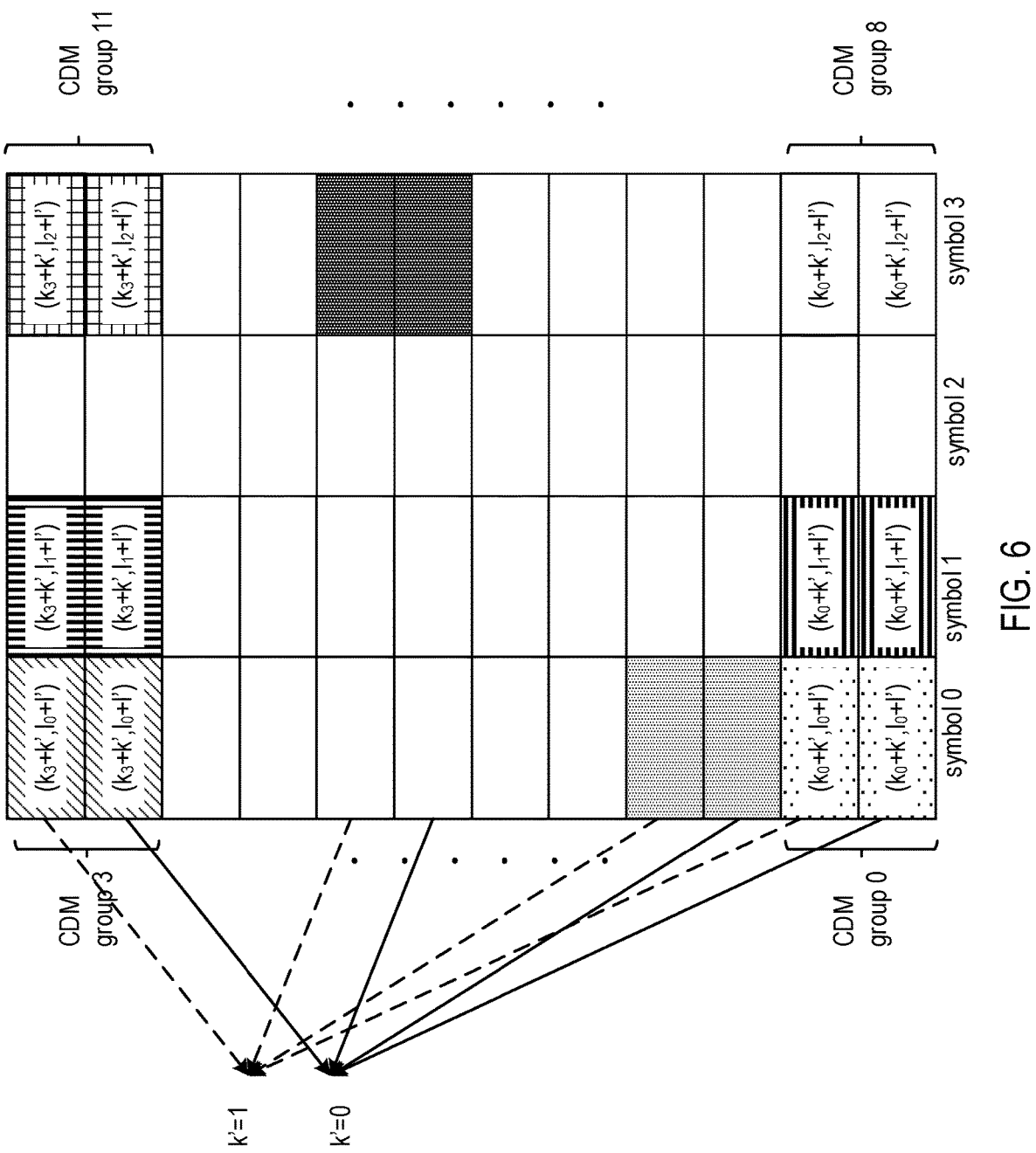

Referring to FIG. 6, depicted is a pattern of the 24-port CSI-RS resource according to information in row 2 of Table 1, with option 2 for the values of k and l. For example, the pattern can include $(k_0, l_0), (k_1, l_0), (k_2, l_0), (k_3, l_0) (k_0, l_1),$ $(k_1, l_1), (k_2, l_1), (k_3, l_1), (k_0, l_2), (k_1, l_2), (k_2, l_2), (k_3, l_2),$ with a configuration of $k_0=0, k_1=2, k_2=6, k_3=10, l_0=0, l_1=1,$ and $l_2=3$ for instance by way of illustration. The pattern of FIG. 6 can be similar to the pattern of FIG. 5, with a gap at symbol 2 (e.g., l=2). In this example, symbol 2 may not be occupied by any CDM group, with symbol 3 occupied by CDM groups 8-11. Accordingly, FIGS. 5-6 can show patterns including 12 CDM groups that occupy three OFDM symbols (e.g., either contiguous or non-contiguous) for each symbol in the time domain and at least a part of a PRB (e.g., eight subcarriers, contiguous or non-contiguous) for frequency band in the frequency domain.

In some implementations, the pattern can be configured in other similar manners. For example, other values can be added to k and/or l, and/or k and/or l can include other values in addition to the values discussed herein. Further, the value of k can be configured such that there is one frequency band (e.g., one block of the pattern in the y-axis) or greater than two frequency bands separating each CDM group in the frequency domain. Similarly, l can be configured such that CDM groups of different symbols may be separated by one or more symbols in the time domain, for example. In some other cases, the pattern may include at least one gap (e.g., spacing, or non-occupying block of the pattern in at least one axis) in the frequency domain without a gap in the time domain or vice versa.

Figure 7:
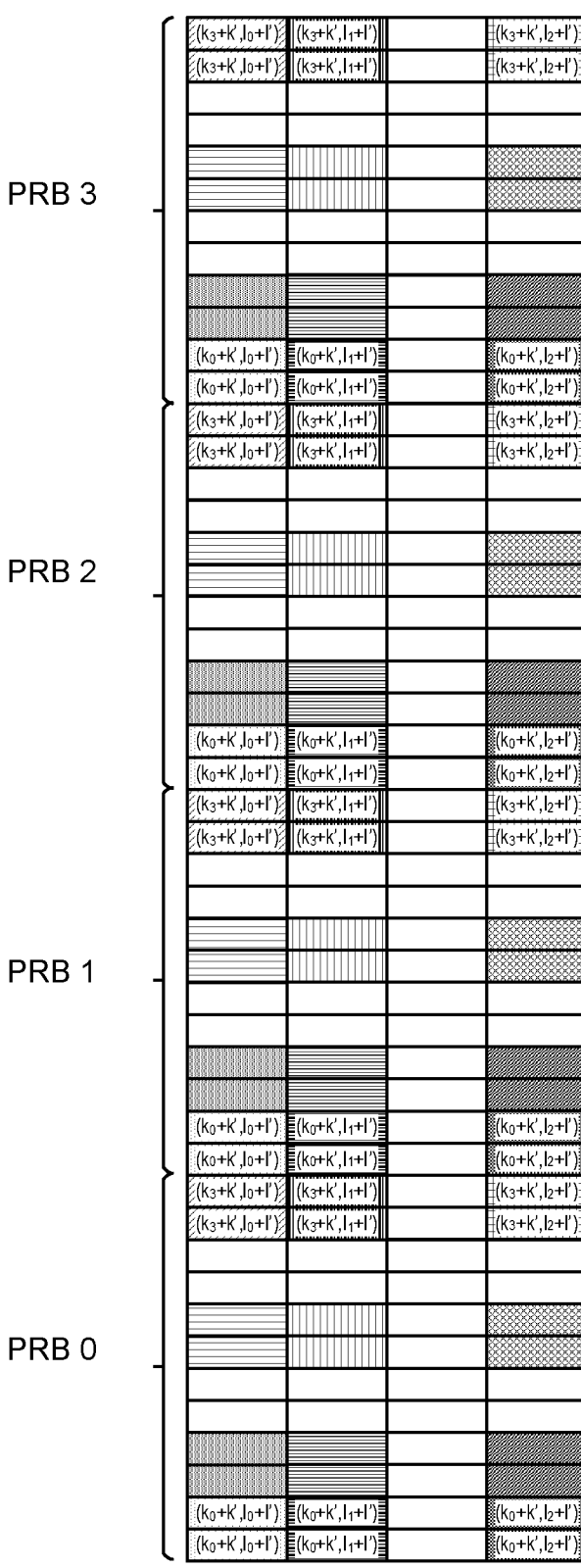
FIG. 7 illustrates an example of a density configuration for two patterns, in accordance with some embodiments of the present disclosure.
Figure 8:
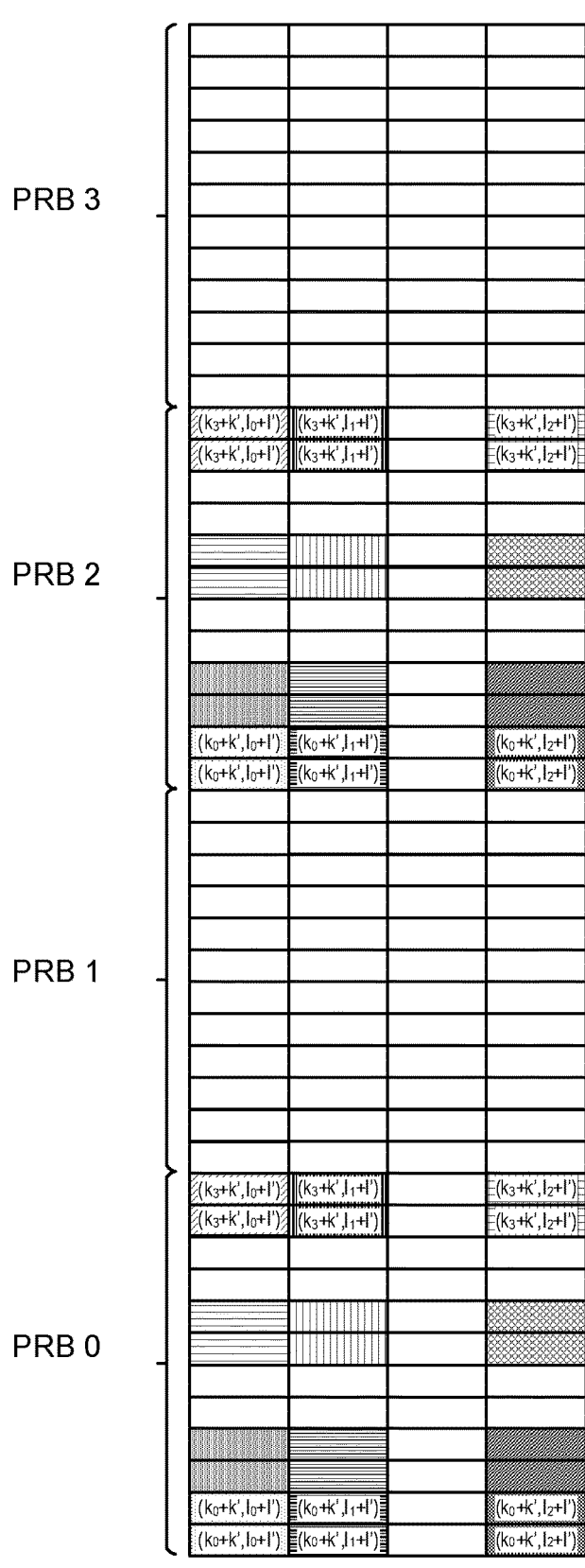
FIG. 8 illustrates an example of another density configuration for two patterns, in accordance with some embodiments of the present disclosure.

Referring to FIGS. 7-8, depicted are examples of density configurations for two patterns. The pattern of FIGS. 7-8 can be based on the pattern of FIG. 6. For example, a density of 1 can be set/configured for the pattern shown in FIG. 7 and a density of 0.5 can be set for pattern shown in FIG. 8. The second row of Table 1 can be used to illustrate the density configuration. In some cases, the first row of Table 1 can be used to illustrate the density configuration, among others. The density may refer to the frequency of scheduling the CSI-RS resource to the UE 104, within a defined time-frequency region (e.g., a defined number of contiguous PRBs).

For example, with a density configuration of 1, each PRB (e.g., PRB s 1-4) can be scheduled for the UE 104, which includes the CDM groups associated with the pattern in FIG. 6 (e.g., as shown in FIG. 7). With a density configuration of 0.5, the pattern density may be reduced by half. For instance, PRB 0 can be occupied, PRB 1 may not be occupied, PRB or procedures discussed herein can determine the corresponding relationship between TRP and port/CDM group (e.g., each CDM group associated with one or more ports, such as two ports in the example herein).

One CSI-RS resource can be split/separated/parsed to N number of CDM group sets corresponding to N number of TRPs, respectively. For example, each TRP can be associated with one CDM group set. Each CDM group set can include one or more CDM groups/ports. The CDM group set can be configured by the radio resource control (RRC) signaling/protocol. For example, the UE 104 may receive an RRC signaling from the BS 102. The RRC may identify one or more CDM groups within each of the CDM group sets. The RRC can include a list of sets of the CDM groups configured for the CSI-RS resource. The pattern of the CSI-RS resource of each CDM group set can satisfy/meet the requirement/criteria/standards of historical/existing patterns in certain systems.

Figure 9:
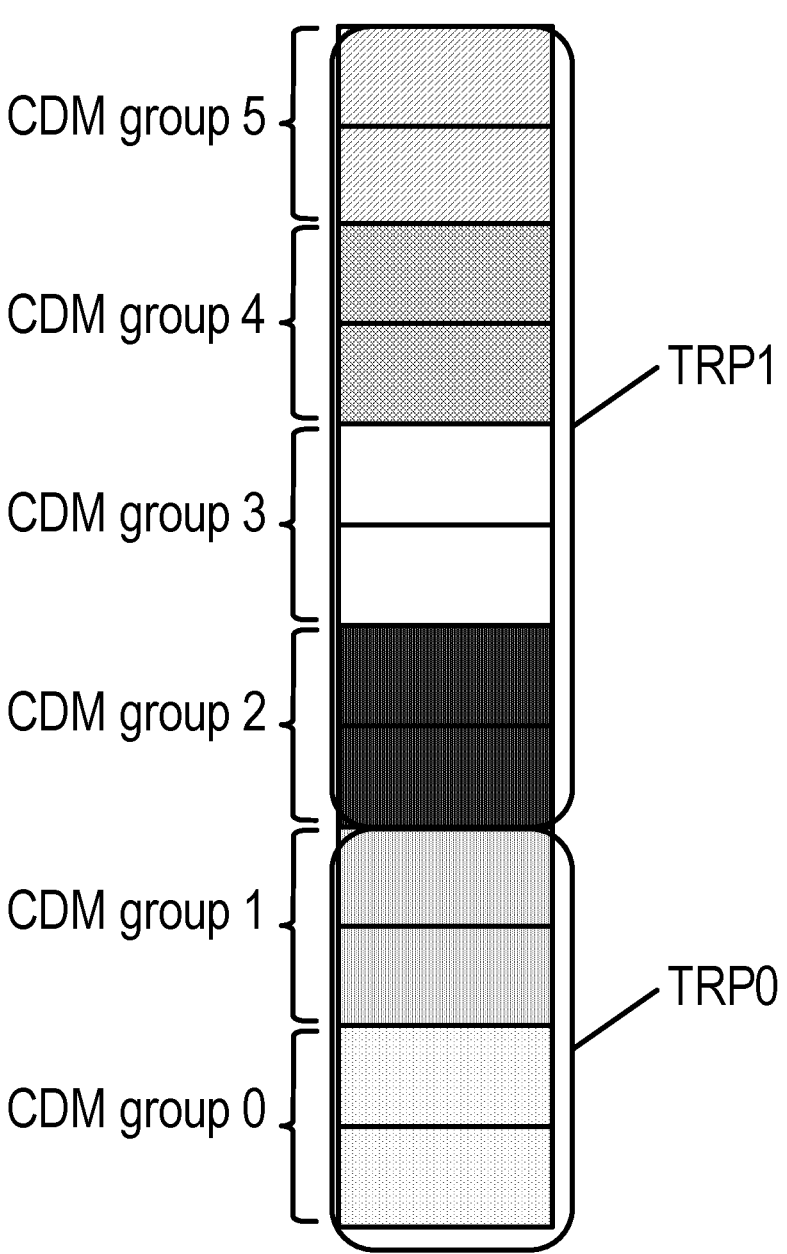
FIG. 9 illustrates an example of a relationship between a CSI-RS pattern with TRPs, in accordance with some embodiments of the present disclosure.

Referring to FIG. 9, depicted is an example of a relationship between a CSI-RS pattern with TRPs. In this case, the UE 104 can be configured with the following RRC parameters from the RRC signal:

```
CSI-RS-ResourceMapping ::=              SEQUENCE {
    frequencyDomainAllocation               CHOICE {
        row1                                    BIT STRING (SIZE (4)),
        row2                                    BIT STRING (SIZE (12)),
        row4                                    BIT STRING (SIZE (3)),
        other                                   BIT STRING (SIZE (6))
    },
    nrofPorts                               ENUMERATED {p1,p2,p4,p8,p12,p16,p24,p32},
    firstOFDMSymbolInTimeDomain                 INTEGER (0..13),
    firstOFDMSymbolInTimeDomain2                INTEGER (2..12)
OPTIONAL, -- Need R
    cdm-Type                                ENUMERATED {noCDM, fd-CDM2, cdm4-FD2-TD2, cdm8-FD2-
TD4},
    density                                 CHOICE {
        dot5                                    ENUMERATED {evenPRBs, oddPRBs},
        one                                     NULL,
        three                                   NULL,
        spare                                   NULL
    },
    freqBand                                CSI-FrequencyOccupation,
        Cdmgroupsetlist                         SEQUENCE {
        Cdmgroupset1                            (0,1),
        Cdmgroupset2                            (2,3,4,5) ,
        ...
        Cdmgroupsetn                            SEQUENCE (SIZE (1..maxNrofCDMgroup)) ,
    }
    ...
}
```

2 can be occupied, and PRB 3 may not be occupied, etc. In this case, the PRBs can be alternatively occupied for CSI-RS signal generation, where the pattern may occupy one of two PRBs (e.g., as shown in FIG. 8). In further example, if the density configuration is 0.25, the pattern may occupy one of four PRBs. The density can be predetermined/preconfigured at the BS 102. The BS 102 can transmit/send the configuration to the UE 104 prior to receiving CSI-RS resource(s) from one or more TRPs.

II. Implementation 2: Indication of One Resource for Multiple TRPs

In some implementations, different TRPs may use the same resource for channel information acquisition. For example, each TRP may send/transmit/provide at least a portion of the CSI-RS resource to the UE 104. Responsive to receiving the CSI-RS resource (e.g., one or more portions of the resource), the UE 104 can measure the CSI-RS resource as a whole. The one or more techniques, operations, For example, a 12-port CSI-RS resource (e.g., six CDM groups) can be configured for channel measurement. In this example, two TRPs can be involved in coherent joint transmission. After receiving the configuration, the UE 104 can determine the CSI-RS pattern and the corresponding relationship of the pattern with the TRPs, such as shown in FIG. 9. For example, with two TRPs, the CDM groups/ports can be separated into two sets, including a first set configured for TRP 0 and a second set configured for TRP 1. The ports corresponding to CDM groups 0 and 1 can be transmitted/sent/delivered from TRP 0, and the ports corresponding to CDM groups 2-5 can be transmitted from TRP 1.

In certain systems, the ports p of CSI-RS can be numbered/ordered/labeled according to:

$p=3000+s+jL$;

$j=0, 1, \ldots, N/L-1$;

$s=0, 1, \ldots, L-1$.

The s can represent, indicate, or correspond to the sequence index, L can indicate the CDM group size, and N can indicate the number of CSI-RS ports. For example, the ports of CSI-RS can be numbered within a respective CDM group prior to numbering the ports of another CDM group. The numbering can increase upward (e.g., in the direction of increasing frequencies in the frequency domain) according to the index of the CDM groups. The index of the CDM group can correspond to the number, order, or identifier of the CDM group. For instance, the numbering of the ports can start from the group at the lowest frequency domain and time domain. The numbering can increase in the order of increasing frequency domain allocation for a symbol (e.g., in the direction of increasing frequencies in the frequency domain). Subsequent to numbering the ports in the symbol, the ports in a subsequent/next symbol of the time domain may be numbered.

In another example, the CDM groups can be numbered in the order of increasing frequency domain allocation. Suborder of CDM group set indexes. For example, the first set can include one CDM group (e.g., set/configured to CDM group 0 including at least port 0 and port 1), the second set can include two CDM groups (e.g., set to CDM groups 1 and 2 according to increasing frequency domain allocation, and subsequently, according to increasing time domain allocation including port 2, port 3, port 4, and port 5), and the third set can include one CDM group (e.g., set to CDM group 3 including port 6 and port 7). Hence, as shown in the FIG. 10, the ports of the first set (e.g., CDM group set 0) can be transmitted from a first TRP, the ports of the second set (e.g., CDM group set 1) can be transmitted from a second TRP, and the ports of the third set (e.g., CDM group set 2) can be transmitted from a third TRP.

In certain specifications or systems, quasi co-location (QCL) information may be configured per resource (e.g., indicated as "qcl-InfoPeriodicCSI-RS") for periodic and/or semi-persistent CSI resources.

```
NZP-CSI-RS-Resource ::=           SEQUENCE {
    nzp-CSI-RS-ResourceId             NZP-CSI-RS-ResourceId,
    resourceMapping              CSI-RS-ResourceMapping,
    powerControlOffset              INTEGER (–8..15),
    powerControlOffsetSS                 ENUMERATED{db-3, db0, db3, db6}      OPTIONAL, -
- Need R
    scramblingID                ScramblingId,
    periodicity AndOffset       CSI-ResourcePeriodicityAndOffset            OPTIONAL, --
Cond PeriodicOrSemiPersistent
    qcl-InfoPeriodicCSI-RS               TCI-StateId                OPTIONAL, -- Cond
Periodic
    ...
}
``` sequently, the CDM groups can be numbered in the order of increasing time domain allocation. Since multiple CDM group sets have been configured, to ensure/confirm/ascertain that the ports allocated to each TRP are continuous, the rule/policy/configuration for numbering the ports across different CDM group sets can be enhanced/improved. For example, the CDM groups can first be numbered/indexed in each CDM group set. Subsequently/Afterwards, the CDM groups can be numbered in the order of increasing frequency domain allocation. Further, the CDM groups can be numbered in the order of increasing time domain allocation (e.g., such as shown in at least FIG. 11 described herein, such as in the direction of increasing time or time units in the time domain). In some cases, the ports of CSI-RS may be numbered within each CDM group, and subsequently, the port numbering can increase upward according to the index of the CDM groups (e.g., order of the CDM groups).

Figure 10:
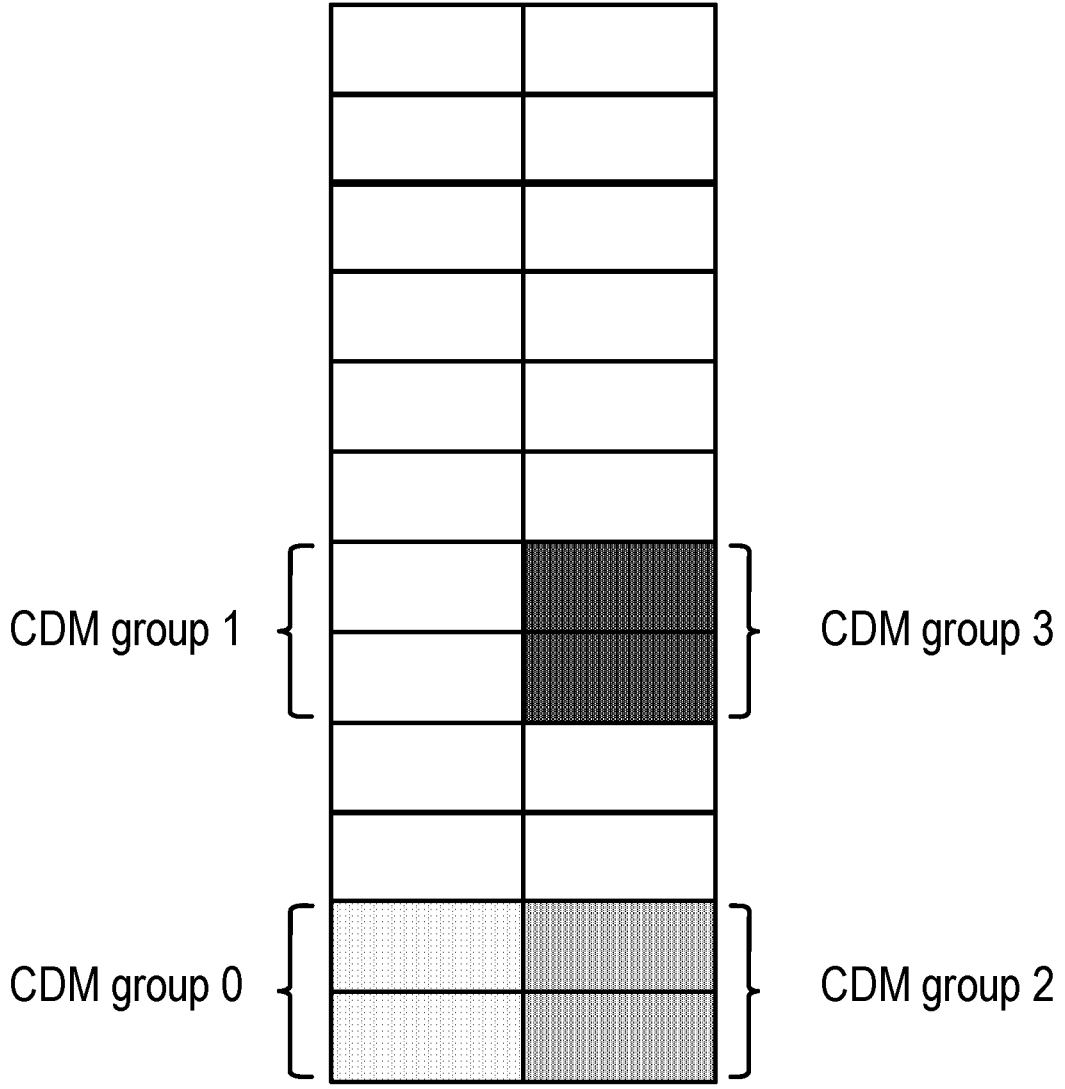
FIG. 10 illustrates an example of a three CDM group set configuration in certain systems, in accordance with some embodiments of the present disclosure.
Figure 11:
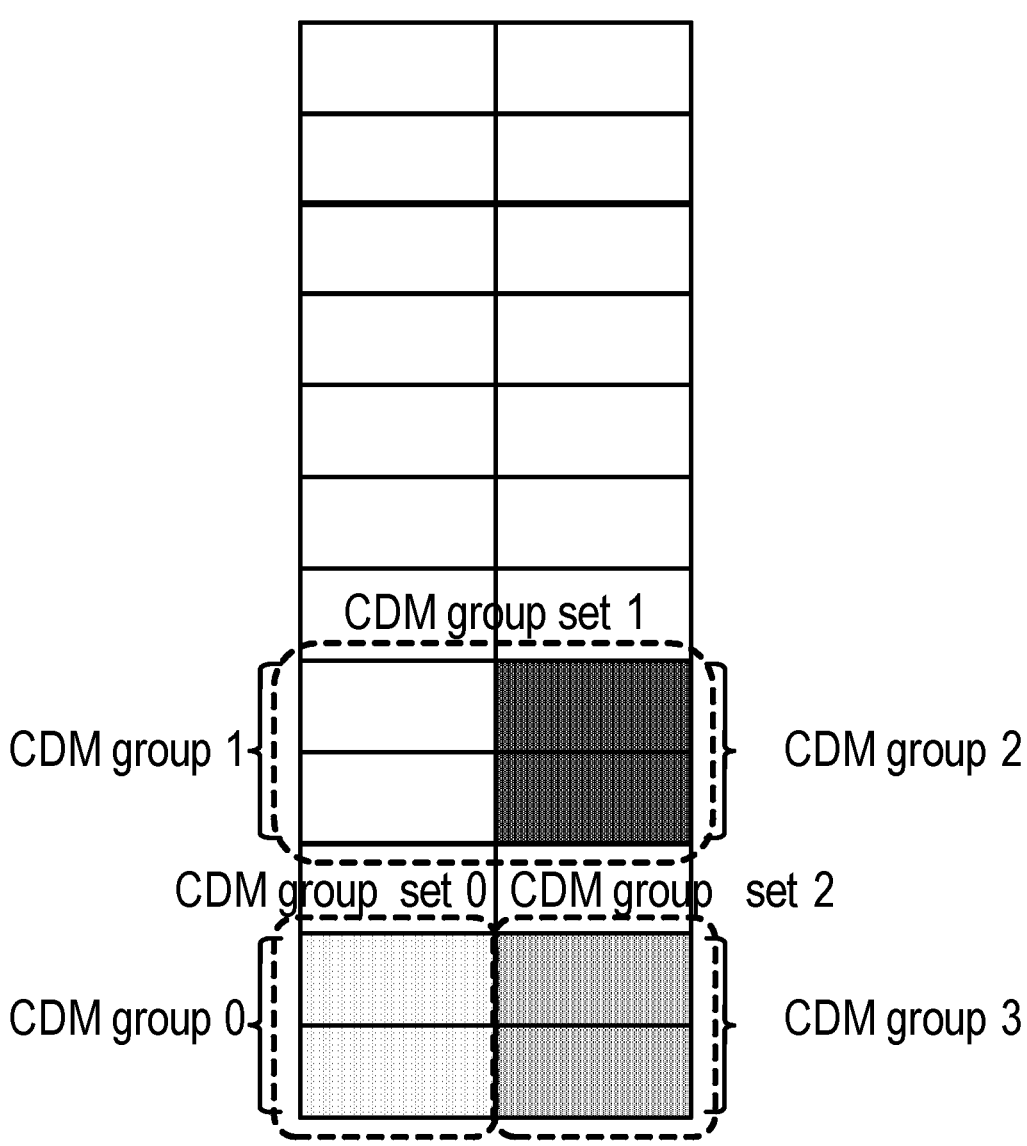
FIG. 11 illustrates an example of a three CDM group set configuration, in accordance with some embodiments of the present disclosure.

Referring to FIG. 10, depicted is an example of a three CDM group set configuration in certain systems. In particular, an 8-port CSI-RS resource can be shown in FIG. 10. In this case, CDM group 0 can include port 0 and port 1, CDM group 1 can include port 2 and port 3, CDM group 2 can include port 4 and port 5, and CDM group 3 can include port 6 and port 7. CDM groups 0-1 can occupy symbol 0, and CDM groups 2-3 can occupy symbol 1. If three TRPs are involved in the coherent joint transmission, three CDM group sets can be configured. FIG. 11 illustrates an example of a three CDM group set configuration. For example, the first set can include CDM group 0, the second set can include CDM groups 1 and 3, and the third set can include CDM group 2.

To enhance the port-numbering procedure/method/operation/function, the CDM groups can be renumbered in the With multiple TRPs involved in CJT using the same CSI-RS resource, one resource can be configured with multiple QCL information (e.g., multiple transmission configuration indicator (TCI) states). Each of the QCL information may correspond to or be associated with a TRP. The RRC parameter qcl-InfoPeriodicCSI-RS can be enhanced/improved/configured/adapted to include/indicate a list of TCI states. Based on the configured multiple CDM group sets, each configured QCL information or TCI state can be associated with one of the CDM group sets. The association of the QCL information or TCI state with the CDM group set can indicate/imply/represent the association relationship between the QCL information and the TRP. For example, one or more CDM group sets may be associated with a particular TRP. If a particular QCL information or TCI state is associated with the one or more CDM group sets, the QCL information or TCI state can be associated with the particular TRP. The indicated TCI-states can associate with CDM groups in a default configuration/manner. For example, the first indicated TCI-State can be associated with CDM group set 0 (e.g., a set of CDM group(s) that has a first or lowest index, transmitted from TRP 0), the second indicated TCI-State can be associated with CDM group set 1 (e.g., of TRP 1), etc.

In certain systems, for aperiodic CSI resources, a list of QCL information can be configured per resource set. Each QCL information list (e.g., indicated as "qcl-info") can include, correspond to, or be a part of a list of TCI states corresponding to each resource set, such as shown below.

```
CSI-AssociatedReportConfigInfo ::= SEQUENCE {
    reportConfigId          CSI-ReportConfigId,
    resourcesForChannel         CHOICE {
        nzp-CSI-RS              SEQUENCE {
            resourceSet            INTEGER (1..maxNrofNZP-CSI-RS-ResourceSetsPerConfig),
            qcl-info               SEQUENCE (SIZE(1..maxNrofAP-CSI-RS-ResourcesPerSet)) OF
TCI-StateId
                                   OPTIONAL -- Cond Aperiodic
        },
        csi-SSB-ResourceSet        INTEGER (1..maxNrofCSI-SSB-ResourceSetsPerConfig)
    },
    ...
}
```

In this case, the CSI-RS resource can be an aperiodic CSI-RS resource configured with various lists of QCL information or lists of TCI states. When multiple TRPs are involved in CJT using the same CSI-RS resource, one resource set can be configured with multiple QCL information lists, where each list can correspond to each TRP. The RRC parameter qcl-info can be enhanced to indicate multiple lists of TCI states. For instance, the qcl-info may be configured to qcl-info1, qcl-info2, etc. indicating multiple QCL information lists.

Based on or according to the configured multiple CDM group sets, each set of CDM group(s) can be associated with a particular list of QCL information or list of TCI states to indicate the association relationship between each QCL information list and a corresponding TRP. For example, the association between CDM group sets and QCL information lists can include a first indicated QCL information list (e.g., qcl-info1, sometimes referred to as a list first indicated from the various lists of QCL information) that is associated with CDM group set 0 (e.g., a set of CDM group(s) that has a first or lowest index), the second indicated QCL information list (e.g., qcl-info2) that is associated with CDM group set 1 (e.g., another set of CDM group(s) with the second-lowest or a subsequent/next index), etc.

Implementation 3: One Resource Repetition for Multiple TRPs

In some implementations, the same CSI-RS resource can be used for transmission N times (e.g., with N transmission occasions) on different symbols or slots in the time domain. The value of N can represent or correspond to the number of TRPs participating in, initiating, or executing the CJT transmission. For example, the TRPs can transmit (e.g., use for transmission of CSI-RS) the same CSI-RS resource in different slots. In another example, the TRPs can transmit the same CSI-RS resource on different symbols within the same slot.

Figure 12:
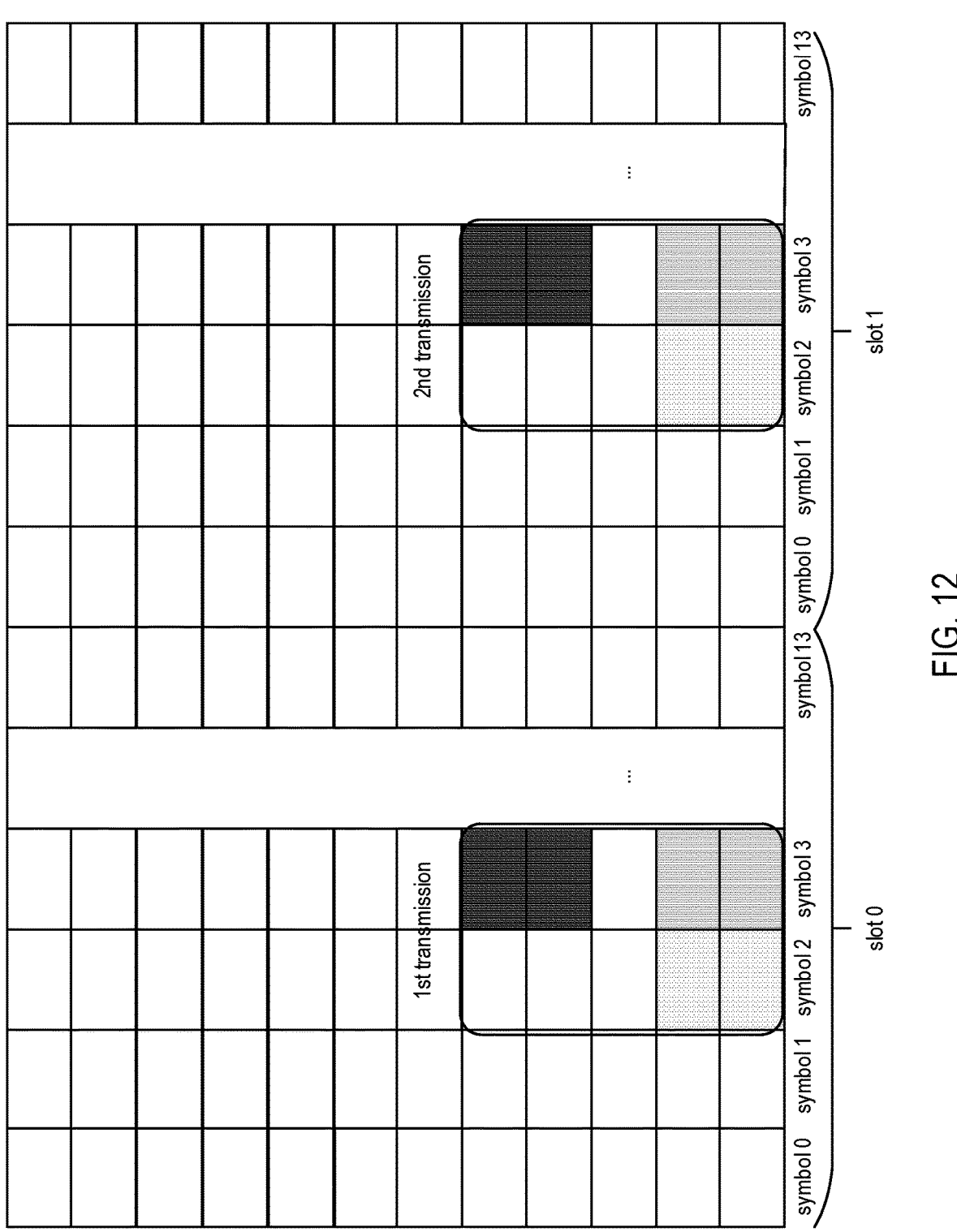
FIG. 12 illustrates an example of transmission occasions of CSI-RS resource on different slots, in accordance with some embodiments of the present disclosure.

FIG. 12 illustrates an example of transmission occasions of CSI-RS resource on different slots. As shown, the first transmission occasion (e.g., transmission at a certain frequency domain and time domain) of the configured CSI-RS resource can depend on, be based on, or be according to the RRC parameters (e.g., identified/provided in the RRC signaling). The remaining (or other) transmission occasions (e.g., the transmission repetitions) can be on the same or similar OFDM symbols and frequency domain resources as the first transmission occasion on the subsequent/different slots. For instance, the pattern of slot 0 can correspond to the pattern of slot 1, among other slots, as shown in FIG. 12. In this case, each slot can range from symbol 0 to symbol 13.

In some implementations, the subsequent slots can be configured/determined as the next/neighboring available slot. For example, if the first transmission occasion is on slot n (e.g., slot 0 configured for TRP 0 to transmit the CSI-RS resource), the second transmission occasion can be on slot n+1 (e.g., slot 1 configured for TRP 1), and so forth. In this case, the $m^{th}$ transmission occasion can be on slot n+m−1 (e.g., transmission by TRP m−1). In another example, if a slot does not meet the transmission requirement, the transmission occasion can be deferred to a different slot in turn (e.g., transmission occasion on two or more slots away from the previous slot).

In some implementations, the subsequent slots or the N transmission occasions can occupy slots indicated by or according to an indication from the BS 102. For example, the indication from the BS 102 can indicate an offset between adjacent pairs of transmission occasions. In this case, the offset can indicate the number of slots to occupy or adjacent slot(s) to skip or not occupy the transmission occasions. If the offset is not configured by BS 102, an offset of zero can be assumed/applied/configured/set by the UE 104. If a specific one of the determined slots fails to meet/satisfy the transmission requirement for the CSI-RS, the next slot that meets the transmission requirement (and available) can be occupied in lieu of/instead of/in place of the specific slot that does not meet the requirement.

Figure 13:
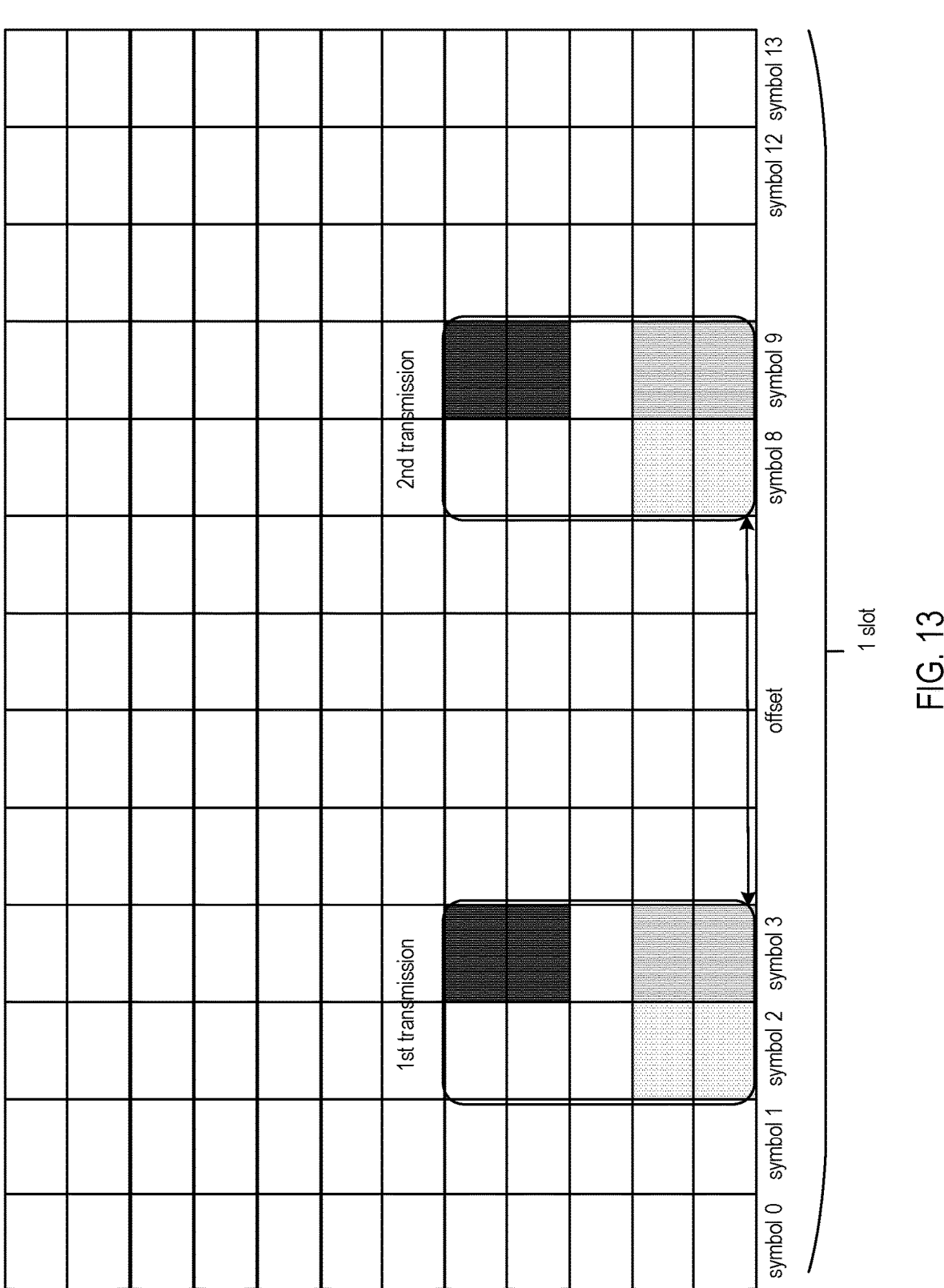
FIG. 13 illustrates an example of transmission occasions of CSI-RS resource on different symbols in the same slot, in accordance with some embodiments of the present disclosure.

FIG. 13 illustrates an example of transmission occasions of CSI-RS resource on different symbols. The first transmission occasion (e.g., transmission at a particular frequency domain and time domain) of the configured CSI-RS resource can depend on (or be configured according to) the RRC parameters. The remaining or other transmission occasions may be on the same frequency domain resources (or frequency bands) and different OFDM symbols in the same slot. The subsequent transmission occasions can include/have/exhibit the same pattern as the first transmission occasion, among others. In this case, the OFDM symbols can be determined as the next/neighboring available symbol or as indicated by the BS 102.

For example, as shown in FIG. 13, if the first transmission occasion is on symbol n (e.g., transmission from TRP 0), the second transmission occasion can be on symbol n+1 (e.g., transmission from TRP 1). Subsequently, the $m^{th}$ transmission occasion can be on symbol n+m−1 (e.g., transmitted by TRP m−1). The $m^{th}$ transmission occasion may be in the same slot as the first transmission occasion. In some cases, the $M^{th}$ transmission occasion may not be in the same slot as the first transmission occasion. In some cases, if a symbol does not meet the transmission requirement (e.g., requirement for the CSI-RS), the transmission occasion can be deferred in turn (e.g., to the next closest or neighboring available symbol that meets the requirement for the CSI-RS).

In another example, the OFDM symbols can be determined or indicated by the BS 102. The indication from the BS 102 can include an offset of a certain number of symbols between adjacent transmission occasions. In some cases, if the offset is not configured by the BS 102, the UE 104 can resort to, assume, or be preconfigured to apply an offset of zero. In some cases, if a particular/specific symbol does not meet the transmission requirement, the transmission occasion can be deferred to the next closest available symbol, for example. Accordingly, as discussed herein, the same CSI-RS resource can be used for various transmission occasions on different symbols or slots by the TRPs.

Figure 14:
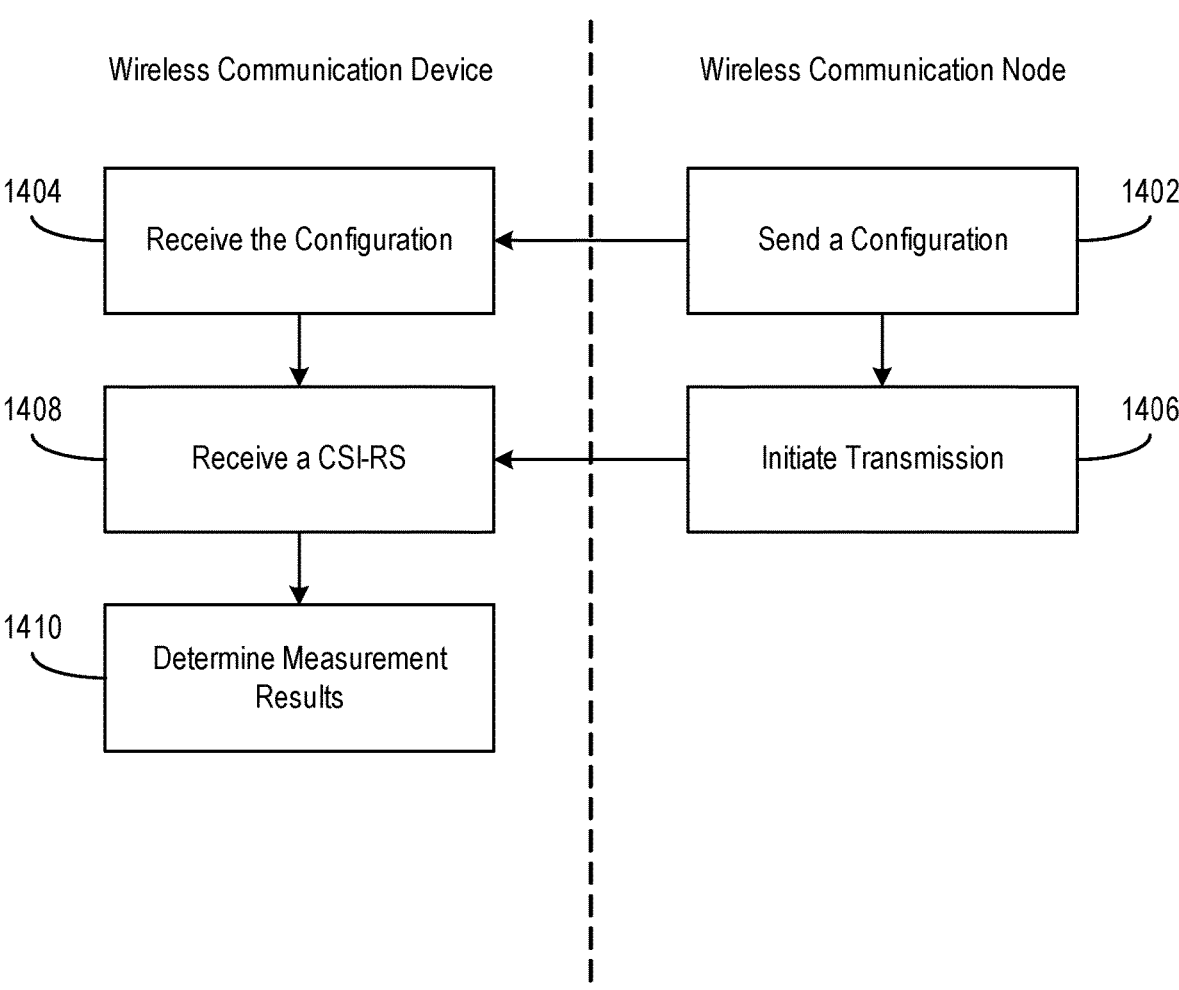
FIG. 14 illustrates a flow diagram of an example method for CSI-RS configuration and indication, in accordance with an embodiment of the present disclosure.

FIG. 14 illustrates a flow diagram of a method 1400 for CSI-RS configuration and indication. The method 1400 can be implemented using any of the components and devices detailed herein in conjunction with FIGS. 1-13. In overview, the method 1400 can include sending a configuration (1402). The method 1400 can include receiving the configuration (1404). The method 1400 can include initiating a transmission (1406). The method 1400 can include receiving a CSI-RS (1408). The method 1400 can include determining measurement results (1410).

Referring now to operation (1402), a wireless communication node (e.g., a gNB/BS) may send/transmit/provide a configuration (e.g., a resource configuration) of a channel state information reference signal (CSI-RS) resource (e.g., one resource) to a wireless communication device (e.g., a UE) for measurement of the various channels. Each channel can be associated with a respective TRP. For example, the measurement of the channels can refer to measuring the quality of each of the channels/signals/communication between the wireless communication device and the TRPs. At operation (1404), the wireless communication device can receive the configuration from the wireless communication node.

In some implementations, the configuration of the CSI-RS resource can include various sets of code division multiplexing (CDM) groups. The CDM groups can correspond to the various channels (and/or TRPs). Each set of CDM group(s) may include at least one CDM group. The one or more TRPs can transmit the CDM groups to the wireless communication device via the respective channels. In some cases, the wireless communication device can receive/obtain/communicate/acquire a radio resource control (RRC) signaling from the wireless communication node. The RRC signaling can indicate/identify one or more CDM groups within each set of CDM groups. In certain cases, the RRC signaling may include a list of the sets of CDM groups configured for the CSI-RS resources. The list can include one or more sets of CDM groups, with each set including at least one CDM group.

In some implementations, one or more CDM groups within a first set of the sets of CDM groups can be first numbered (e.g., initiate the numbering process/procedure) in order/sequence of increasing frequency domain allocation, and then/subsequently numbered in order of increasing time domain allocation. For example, the numbering can start at the CDM group occupying the lowest frequency domain resource allocation and the lowest symbol (e.g., symbol 0). The numbering of the CDM groups can continue upward the frequency domain to any subsequent sets. For each of the sets, the CDM group numbering can be performed on all CDM groups of the set prior to advancing to numbering a different set, such as shown and described in at least FIG. 11. In this case, the CDM group 0 can be numbered for set 0, CDM groups 1 and 2 can be numbered for set 1 occupying a higher frequency domain resource and more than one symbol, and CDM group 3 can be numbered for set 2 after numbering CDM groups of set 1.

In some implementations, ports of the CSI-RS in a CDM group numbered with the lowest group number/index/order/ integer/value can be numbered with one or more lowest contiguous/adjacent/neighboring port numbers/indexes. In some cases, ports that are numbered with a group number immediately higher than or neighboring the lowest group number can be numbered with contiguous port numbers that are immediately higher than the lowest contiguous port numbers. In some implementations, RRC parameter qcl-InfoPeriodicCSI-RS can be configured to include one or more transmission configuration indicator (TCI) states. In some cases, RRC parameter qcl-Info can be configured to include various lists of TCI states. In some other cases, one or more RRC parameters can each be configured to include a respective one of the lists of TCI states.

At operation (1406), the wireless communication node can initiate/start/execute the transmission of a CSI-RS to the wireless communication device according to the configuration (e.g., the configuration sent to the wireless communication device). For example, the wireless communication node can initiate transmission of the CSI-RS via multiple TRPs corresponding to the sets of CDM groups. The wireless communication node can perform the initiation in response to or subsequent to providing the configuration to the wireless communication. In some cases, the wireless communication node can initiate the transmission in response to an acknowledgment, confirmation, or response from the wireless communication device indicating that the configuration is received. At operation (1408), the wireless communication device can receive the CSI-RS from the wireless communication node, such as via (joint transmission by) one or more TRPs.

In some implementations, the CSI-RS resource can be a periodic or semi-persistent CSI-RS resource. In this case, the CSI-RS resource may be configured with various quasi co-location (QCL) information or TCI states. Each of the CDM group set or set of CDM groups can be associated with each QCL information or each TCI state. In some cases, a TCI state that is first indicated from the various TCI states (or a QCL information that is first indicated from multiple QCL information) can be associated with a CDM group set that has a first or lowest index. For instance, with sets 0, 1, and 2, the first or lowest CDM group set index can refer to set 0.

In some implementations, the CSI-RS resource can be an aperiodic CSI-RS resource. In this case, the CSI-RS resource can be configured with multiple lists of QCL information or lists of TCI states. Each of the sets of CDM groups can be associated with each of the lists of QCL information or each of the lists of TCI states. In some cases, a list of TCI states that is first indicated from the lists of TCI states (or a list of QCL information that is first indicated from the lists of QCL information) may be associated with at least one set of CDM groups that has a first or lowest index.

In certain aspects, the wireless communication device can receive (an indication of) N transmission occasions (e.g., each being a respective frequency domain and time domain region) of the CSI-RS from the wireless communication node according to or using the configuration of the CSI-RS resource. The N transmission occasions may correspond to the multiple channels (and/or TRPs). Each of the N transmission occasions can be in a respective slot or at least one respective symbol. The N can include or correspond to any integer value that is greater than 1, for example. For instance, the wireless communication device can receive the CSI-RS in two or more transmission occasions at certain time slots or symbols from the wireless communication node.

In some cases, each of the N transmission occasions may be transmitted in the same set of at least one symbol, but in a different slot. In this case, after the first transmission occasion, subsequent, remaining, or other transmission occasions can be on the same symbols in the time domain as the first transmission occasion, but in one or more next/neighboring slots. In some other cases, each of the N transmission occasions may be transmitted in a different set of at least one symbol. In this case, after the first transmission occasion, the remaining/other transmission occasion(s) may be on different symbols within the same slot.

In some implementations, time domain and frequency domain resource allocation of a first transmission occasion of the N transmission occasions can be indicated by one or more RRC parameters. Each subsequent one of the N transmission occasions can be in the next closest available symbol from a symbol of an immediately preceding (e.g., previous) one of the N transmission occasions (e.g., an available symbol neighboring or immediately after the previous transmission occasion). The transmission occasion can include the same CSI-RS pattern as the pattern of the first transmission occasion of the N transmission occasions.

In some implementations, each subsequent one of the N transmission occasions may be in or occupying the next closest available slot from a slot of an immediately preceding (e.g., previous) one of the N transmission occasions. The subsequent N transmission occasion may be in the same frequency domain resource allocation and positions of the time domain symbols as those of a first transmission occasion of the N transmission occasions. In certain cases, the next closest available slot or symbol can be the next closest slot or symbol that meets a transmission requirement for the CSI-RS. The transmission requirement may be indicated in the configuration, for example.

In some implementations, in a CSI-RS pattern, mapping of the CSI-RS to physical resources (e.g., physical resource block (PRB)) over the N transmission occasions can be such that a time domain symbol shape/pattern/format (e.g., relative arrangement of allocated REs) of each of the N transmission occasions can be the same. With the same pattern for the transmission occasions, position(s) of time domain symbols of each of the N transmission occasions can be the same (e.g., different transmission occasions in different slots) or different (e.g., different transmission occasions in the same slot).

In some implementations, the N transmission occasions may occupy multiple slots or symbols determined according to an indication from the wireless communication node. In some cases, the indication may include an offset between adjacent slots or symbols. For example, the offset may indicate/set/configure a gap or separation between a particular transmission occasion of a certain symbol to the next transmission occasion of a different symbol. In some cases, if the offset is not configured (e.g., value is not specified/configured in the indication from the wireless communication node), an offset of 0 can be applied. For instance, the wireless communication device can apply the offset of 0 in response to determining that no offset has been configured/specified/conveyed by the wireless communication node. In some cases, if a specific one of the determined slots or symbols fails to meet a transmission requirement for the CSI-RS, the next/subsequent one of the determined slots or symbols that meet/satisfy the transmission requirement can be occupied/filled/established in lieu of (e.g., in place of) the specific one (e.g., slots or symbols).

In some implementations, the CSI-RS may include 12 CDM groups corresponding to a certain CSI-RS pattern. The CSI-RS pattern may include a pattern of $(k_0, l_0)$, $(k_1, l_0)$, $(k_2, l_0)$, $(k_3, l_0)$, $(k_4, l_0)$, $(k_5, l_0)$, $(k_0, l_0+1)$, $(k_1, l_0+1)$, $(k_2, l_0+1)$, $(k_3, l_0+1)$, $(k_4, l_0+1)$, $(k_5, l_0+1)$; $(k_0, l_0)$, $(k_1, l_0)$, $(k_2, l_0)$, $(k_3, l_0)$, $(k_4, l_0)$, $(k_5, l_0)$, $(k_0, l_1)$, $(k_1, l_1)$, $(k_2, l_1)$, $(k_3, l_1)$, $(k_4, l_4)$, $(k_5, l_1)$; $(k_0, l_0)$, $(k_1, l_0)$, $(k_2, l_0)$, $(k_3, l_0)$, $(k_0, l_0+1)$, $(k_1, l_0+1)$, $(k_2, l_0+1)$, $(k_3, l_0+1)$, $(k_0, l_0+2)$, $(k_1, l_0+2)$, $(k_2, l_0+2)$, $(k_3, l_0+2)$; or $(k_0, l_0)$, $(k_1, l_0)$, $(k_2, l_0)$, $(k_3, l_0)$ $(k_0, l_1)$, $(k_1, l_1)$, $(k_2, l_1)$, $(k_3, l_1)$, $(k_0, l_2)$, $(k_1, l_2)$, $(k_2, l_2)$, $(k_3, l_2)$, for example. The $k_0$, $k_1$, $k_2$, $k_3$, $k_4$, $k_5$, $l_0$ and $l_1$ can each represent or correspond to an integer value. In some other implementations, the configuration of the CSI-RS pattern may be different, vary, or include other patterns. In some other cases, the CSI-RS may include a different number of CDM groups, such as 4, 8, 12, among other numbers/counts of CDM groups, which correspond to different patterns.

In some implementations, the CSI-RS pattern may be associated with at least one of: 24 ports, or a CDM type of time domain (td)-CDM2. The CSI-RS pattern may include a certain density value, such as 1, 0.5, among others. In some cases, the CSI-RS pattern may be defined according to or based on at least one of: a frequency domain offset (k') of 0 or 1, or a time domain offset (l') of 0. The frequency domain offset may indicate the number of frequency domain resources utilized by individual CDM groups (e.g., k'=0 and k'=1 for each CDM group). The frequency domain offset and/or the time domain offset may be configured/set/modified/updated to one or more different values based on the configuration from the wireless communication node.

At operation (1410), the wireless communication device can determine measurement results according to the configuration of the CSI-RS resource. The wireless communication device can perform the measurement in response to or subsequent to receiving the CSI-RS resources from the TRPs, such as initiated by the wireless communication node. Accordingly, as discussed herein, the configuration and indication of the CSI-RS resources can be established at the wireless communication node and provided to the wireless communication device for communication in multi-TRPs environment.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

What is claimed is:

1. A method comprising:

receiving, by a wireless communication device from a wireless communication node via a plurality of transmission and reception points (TRPs), a configuration of a channel state information reference signal (CSI-RS) resource for measurement of a plurality of channels associated with the plurality of TRPs, the configuration comprising at least one CSI-RS pattern indicative of the CSI-RS resource in a time domain and a frequency domain;

receiving, by the wireless communication device from the wireless communication node, N transmission occasions of the CSI-RS corresponding to the plurality of channels according to the configuration of the CSI-RS resource, wherein each of the N transmission occasions of the CSI-RS is transmitted in a same set of at least one symbol in a different slot, where N is an integer value greater than 1; and determining, by the wireless communication device, measurement results based on the N transmission occasions of the CSI-RS according to the configuration of the CSI-RS resource.

2. The method of claim 1, wherein the configuration of the CSI-RS resource includes a plurality of sets of code division multiplexing (CDM) groups corresponding to the plurality of channels, and each of the plurality of sets of CDM groups comprises at least one CDM group.

3. The method of claim 2, comprising:

receiving, by the wireless communication device from the wireless communication node, a radio resource control (RRC) signaling that identifies one or more CDM groups within each set of the plurality of sets of CDM groups.

4. The method of claim 2, comprising:

receiving, by the wireless communication device from the wireless communication node, a radio resource control (RRC) signaling that includes a list of the sets of CDM groups configured for the CSI-RS resource.

5. The method of claim 2, wherein one or more CDM groups within a first set of the plurality of sets of CDM groups are first numbered in order of increasing frequency domain allocation, and then numbered in order of increasing time domain allocation.

6. The method of claim 5, wherein:
ports of the CSI-RS in a CDM group numbered with a lowest group number, are numbered with lowest contiguous port numbers, and
ports of the CSI-RS in a CDM group numbered with a group number immediately higher than the lowest group number, are numbered with contiguous port numbers that are immediately higher than the lowest contiguous port numbers.

7. The method of claim 2, wherein the CSI-RS resource is a periodic or semi-persistent CSI-RS resource, and is configured with a plurality of quasi co-location (QCL) information or a plurality of transmission configuration indicator (TCI) states.

8. The method of claim 2, wherein radio resource control (RRC) parameter qcl-InfoPeriodicCSI-RS is configured to include a plurality of transmission configuration indicator (TCI) states.

9. The method of claim 7, wherein each of the plurality of sets of CDM groups is associated with each of the plurality of QCL information or each of the plurality of TCI states.

10. The method of claim 9, wherein a TCI state that is first indicated from the plurality of TCI states, or a QCL information that is first indicated from the plurality of QCL information, is associated with a set of CDM groups that has a first or lowest index.

11. The method of claim 2, wherein the CSI-RS resource is an aperiodic CSI-RS resource, and is configured with a plurality of lists of quasi co-location (QCL) information or a plurality of lists of transmission configuration indicator (TCI) states.

12. The method of claim 2, wherein radio resource control (RRC) parameter qcl-Info is configured to include a plurality of lists of transmission configuration indicator (TCI) states, or a plurality of RRC parameters is each configured to include a respective one of the plurality of lists of TCI states.

13. The method of claim 11, wherein each of the plurality of sets of CDM groups is associated with each of the plurality of lists of QCL information or each of the plurality of lists of TCI states.

14. The method of claim 13, wherein a list of TCI states that is first indicated from the plurality of lists of TCI states, or a list of QCL information that is first indicated from the plurality of lists of QCL information, is associated with a set of CDM groups that has a first or lowest index.

15. The method of claim 1, wherein each of the N transmission occasions of the CSI-RS is in a respective slot or at least one respective symbol.

16. The method of claim 15, wherein each of the N transmission occasions of the CSI-RS is transmitted in a different set of at least one symbol.

17. A method comprising:
sending, by a wireless communication node via a plurality of transmission and reception points (TRPs), a configuration of a channel state information reference signal (CSI-RS) resource for measurement of a plurality of channels associated with the plurality of TRPs, the configuration comprising at least one CSI-RS pattern indicative of the CSI-RS resource in a time domain and a frequency domain; and
initiating, by the wireless communication node to a wireless communication device, transmission of N transmission occasions of the CSI-RS corresponding to the plurality of channels according to the configuration of the CSI-RS resource, wherein each of the N transmission occasions of the CSI-RS is transmitted in a same set of at least one symbol in a different slot, where N is an integer value greater than 1.

18. A wireless communication device, comprising: at least one processor configured to:
receive, via a receiver from a wireless communication node and via a plurality of transmission and reception points (TRPs), a configuration of a channel state information reference signal (CSI-RS) resource for measurement of a plurality of channels associated with the plurality of TRPs, the configuration comprising at least one CSI-RS pattern indicative of the CSI-RS resource in a time domain and a frequency domain;
receive, from the wireless communication node, N transmission occasions of the CSI-RS corresponding to the plurality of channels according to the configuration of the CSI-RS resource, wherein each of the N transmission occasions of the CSI-RS is transmitted in a same set of at least one symbol in a different slot, where N is an integer value greater than 1; and
determine measurement results based on the N transmission occasions of the CSI-RS according to the configuration of the CSI-RS resource.

19. A wireless communication node, comprising: at least one processor configured to:
send, via a transmitter and via a plurality of transmission and reception points (TRPs), a configuration of a channel state information reference signal (CSI-RS) resource for measurement of a plurality of channels associated with the plurality of TRPs, the configuration comprising at least one CSI-RS pattern indicative of the CSI-RS resource in a time domain and a frequency domain; and
initiate, to a wireless communication device, transmission of N transmission occasions of the CSI-RS corresponding to the plurality of channels according to the configuration of the CSI-RS resource, wherein each of the N transmission occasions of the CSI-RS is transmitted in a same set of at least one symbol in a different slot, where N is an integer value greater than 1.

* * * * *